United States Patent
Enomoto

(10) Patent No.: US 6,747,757 B1
(45) Date of Patent: Jun. 8, 2004

(54) IMAGE PROCESSING METHOD AND APPARATUS

(75) Inventor: Jun Enomoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/315,036

(22) Filed: May 20, 1999

(30) Foreign Application Priority Data

May 20, 1998 (JP) .......................... 10-139003
Jun. 16, 1998 (JP) .......................... 10-168768

(51) Int. Cl.[7] .............................. H04N 5/225
(52) U.S. Cl. ......................... 358/1.9; 382/260
(58) Field of Search ................. 382/260–269, 382/199–200, 1.9, 2.1

(56) References Cited

U.S. PATENT DOCUMENTS 6,097,430 A * 8/2000 Komiya et al. .......... 348/218.1
6,339,466 B1 * 1/2002 Matama ...................... 355/40
6,376,821 B1 * 4/2002 Kikuchi et al. .......... 250/208.1

FOREIGN PATENT DOCUMENTS

JP 6311425 11/1994
JP 9281613 10/1997
JP 2000125175 A * 4/2000 .......... H04N/5/232

* cited by examiner

*Primary Examiner*—Thomas D. Lee
*Assistant Examiner*—Stephen Brinich
(74) *Attorney, Agent, or Firm*—Birch, Stewart, Kolasch & Birch, LLP

(57) ABSTRACT

An image processing method and apparatus compensate at least one aberration of a chromatic aberration of magnification and a distortion aberration, etc., by using position information of an image for input image data obtained from the image optically photographed by use of a photographic lens. In this case, an aberration compensating level is first set to an initial value, the input image data is subjected to a compensating process of the aberration, and thereafter the result is displayed on a monitor. A compensating level can be designated for the initial value at a plurality of stages. Each time when a compensating level is designated to one of the plurality of stages, the compensating process of the aberration is again performed for the input image data according to the compensating level of the designated stage. The aberration compensation result is displayed on the monitor. According to the method and apparatus, without lens characteristics being obtained, and to ensure to output as a photo print important information of images such as a main subject to be photographed, a deterioration of an image quality such as an aberration due to the lens characteristics can be compensated properly and with high precision, taking the vignetting of the image into consideration.

14 Claims, 18 Drawing Sheets

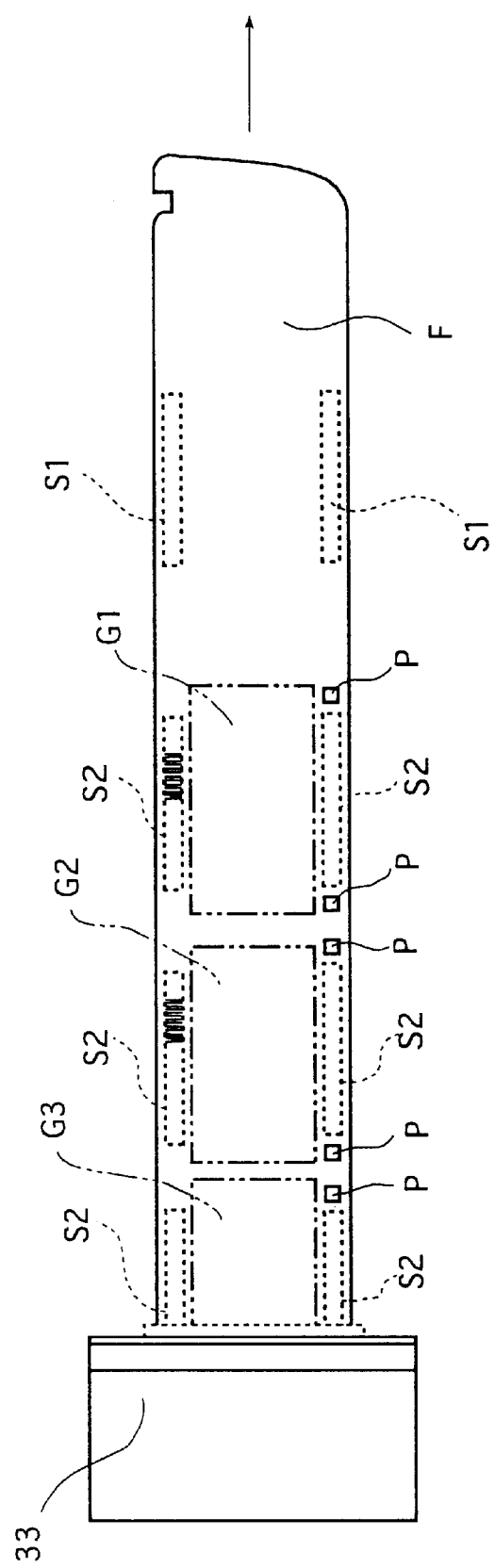

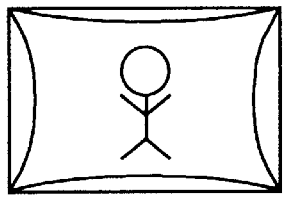 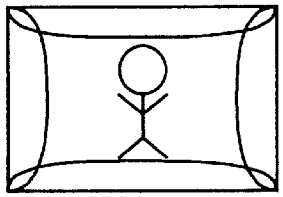 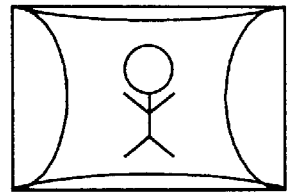
FIG.8A — COMPENSATION LEVEL:LOW
FIG.8B — COMPENSATION LEVEL:HIGH
FIG.8C — COMPENSATION LEVEL:HIGH IN HORIZONTAL DIRECTION, LOW IN VERTICAL DIRECTION
FIG.9A 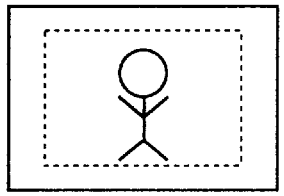  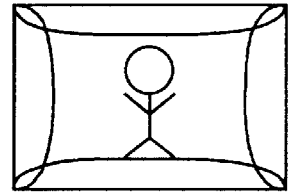
SPECIFY PRINT AREA → PERFORM COMPENSATION WITHIN SPECIFIED AREA
FIG.9B 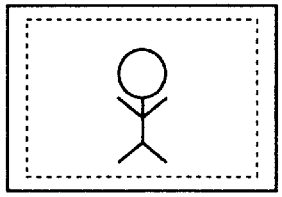  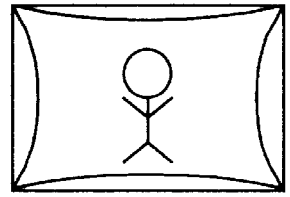
SPECIFY PRINT AREA → PERFORM COMPENSATION WITHIN SPECIFIED AREA

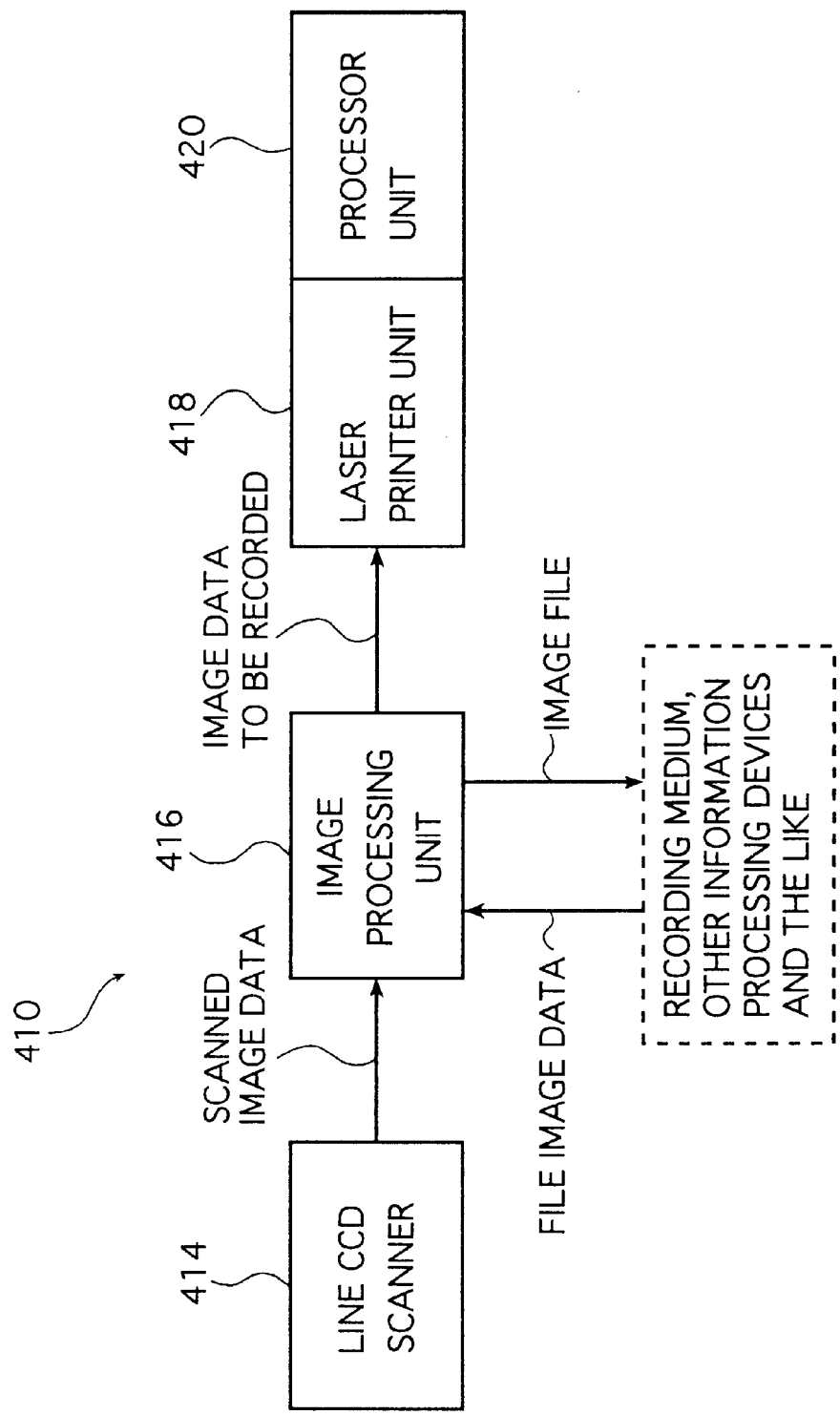

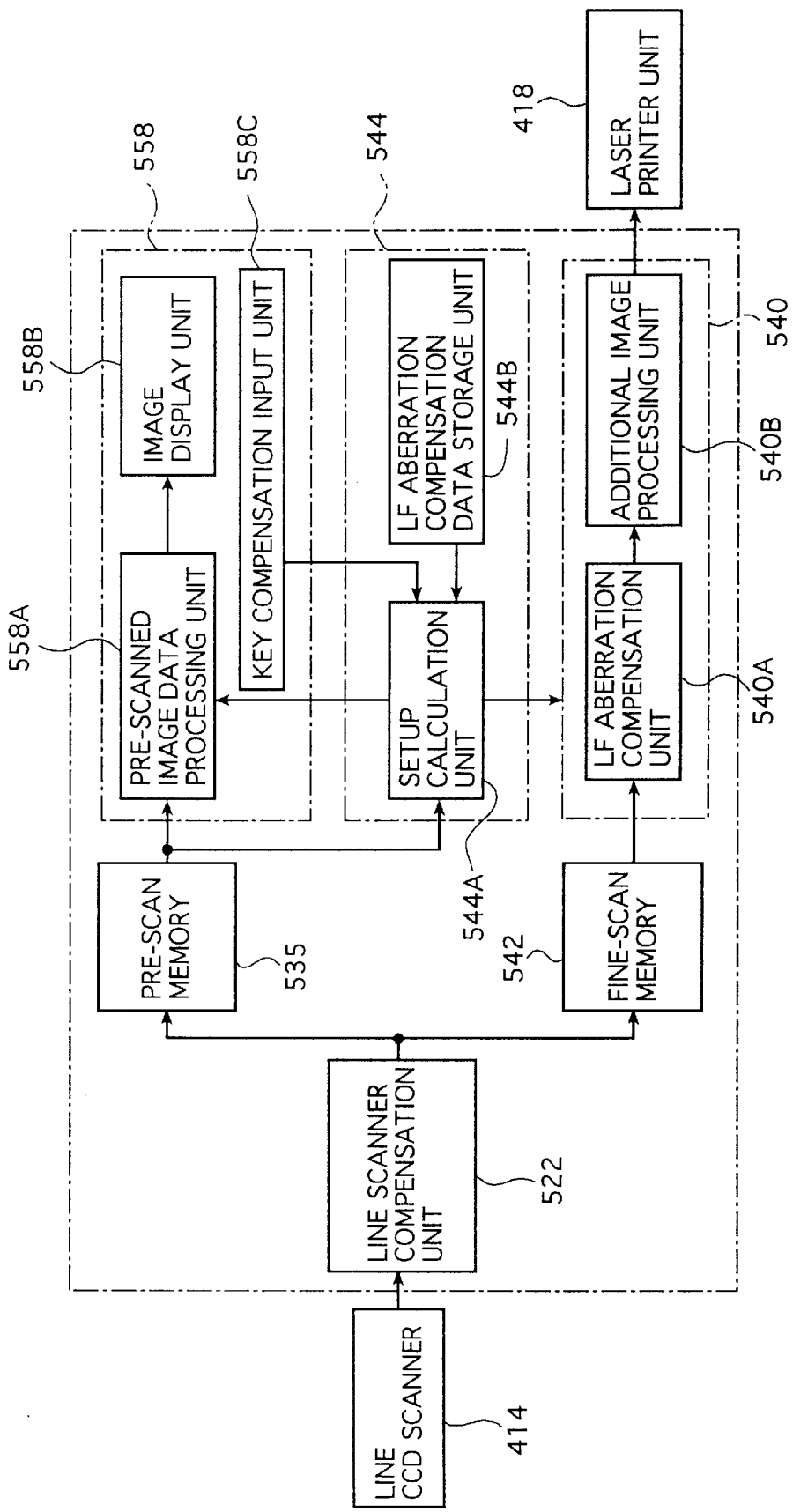

x-y COORDINATE SYSTEM xp-yp COORDINATE SYSTEM

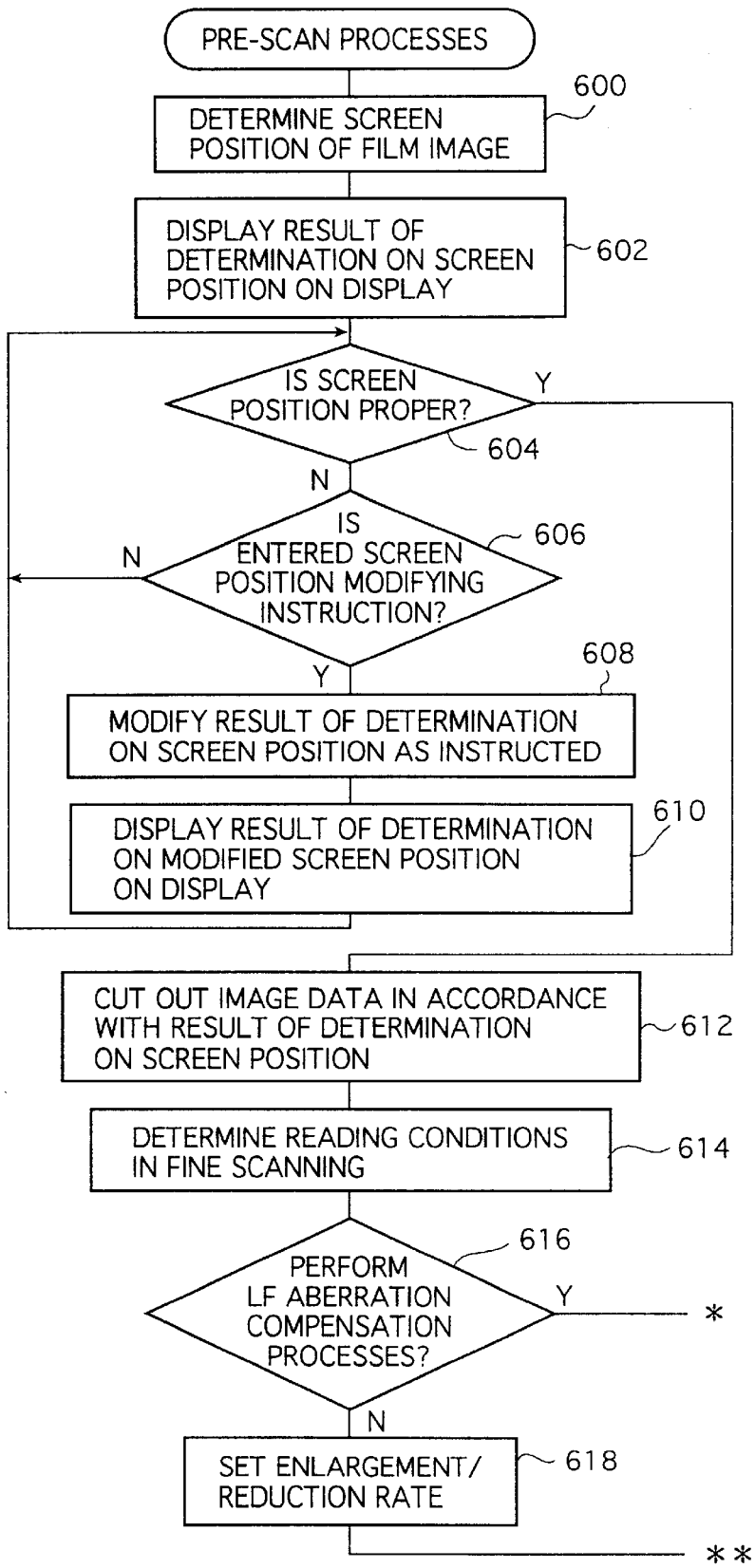

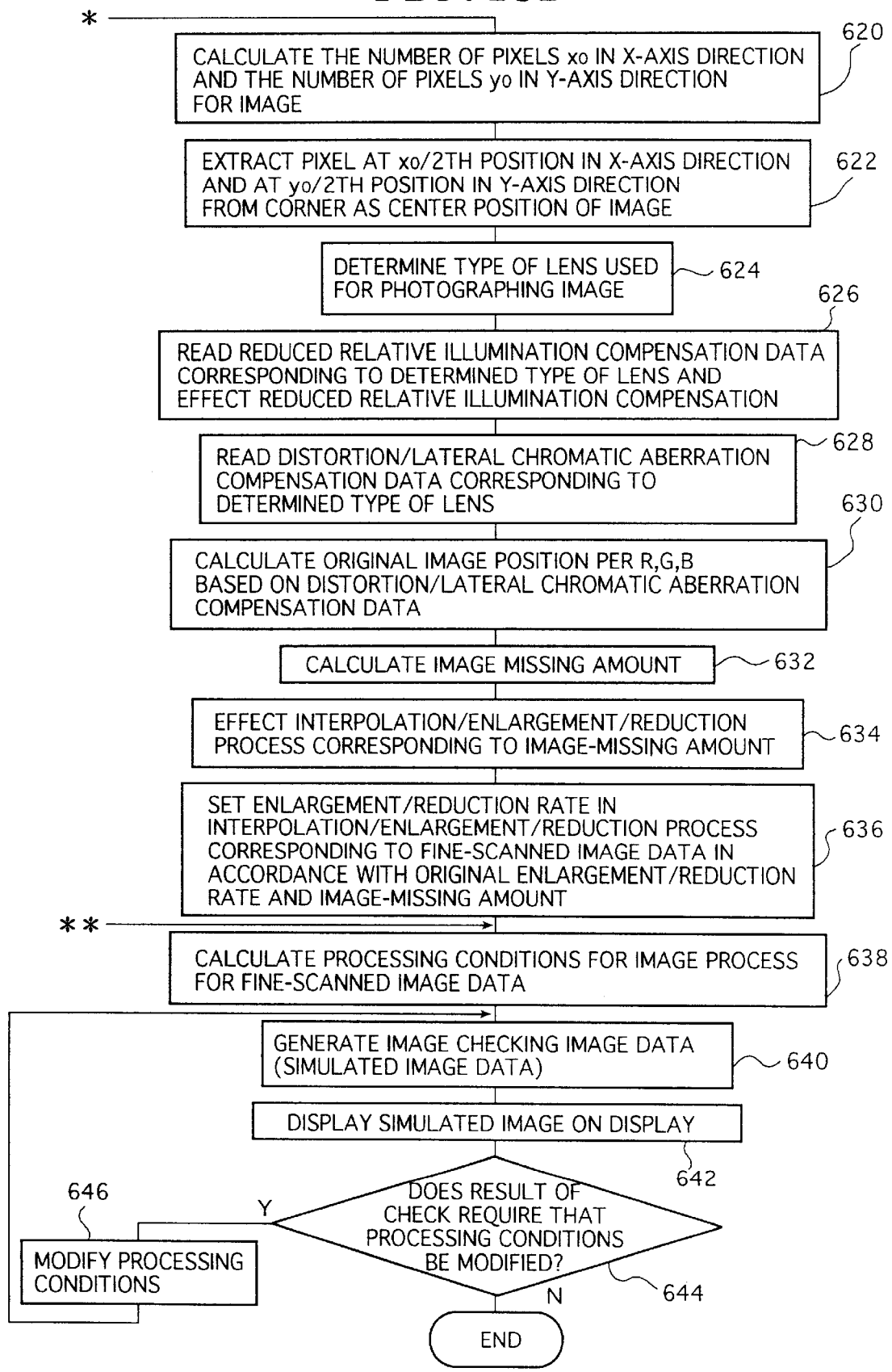

IMAGE PROCESSING METHOD AND APPARATUS

BACKGROUND OF THE INVENTION

The present invention relates to an image processing method and apparatus, more particularly, to an image processing apparatus for compensating a deterioration of an image quality of an image representing image data, which occurs due to lens characteristics, for the image data of the image obtained by reading a recording material on which the image is projected and recorded through a lens. More specifically, the present invention relates, in a digital photo printer, etc. for obtaining digital image data by photoelectrically reading an image photographed on a film or an image directly as digital image data by photographing with an image pickup device and a print (photograph) reproducing the thus obtained image as digital image data, to an image processing method and apparatus based on a technical field of compensating aberrations such as a transverse chromatic aberration and a distortion aberration due to a photographic lens, which occur in an image captured by a lens-attached film, an inexpensive compact camera, or a digital camera, etc.

Currently, printing on a photosensitive material (photographic printing paper) an image photographed on a photographic film such as a negative film and a reversal film (hereinafter referred to as a film), has been executed by a so-called direct exposure (analog exposure) of exposing a surface of the photosensitive material to the light by projecting the film image upon the photosensitive material.

By contrast, there has been hitherto also known an image processing system in which for image data obtained by reading a film image recorded on a photographic film or image data inputted from a digital camera, etc., after performing various image processes, it is capable of outputting the image in various output forms such as recording the image to a recording material, e.g., a photographic printing paper, displaying the image on display means, e.g., a display, and storing the image data into an information recording medium. According to this image processing system, as compared with the conventional photographic processing system for recording the film image to the photographic printing paper through the surface exposure, an image quality of output image from the image processing system can freely be controlled by the image processing for the image data, so that the output image having a high quality can be realized.

That is, in this image processing system, there has been in recent years utilized a printing apparatus that makes use of a digital exposure, i.e., a digital photo printer for obtaining a (finished) print by photoelectrically reading an image recorded on the film, converting the read image into digital signals, thereafter conducting a variety of image processing on the digital signals to thereby acquire output image data for recording, and recording the image (latent image) by scan-exposing the photosensitive material to recording light modulated in correspondence with the output image data.

The digital photo printer is capable of converting the image into digital image data and determining an exposure condition upon printing through the image data processing and is therefore able to obtain a high-definition print, which could not be acquired so far by the prior art direct exposure method, by preferably compensating a white compression and a black compression which might be attributed to back light and flash photography, etc., executing a sharpness (sharpening) process, compensating a failure in terms of shortage of a peripheral light quantity and the like.

In case that a distortion occurs in the image photographed and recorded on the film, however, the image quality of the output image outputted as a photo print cannot often be improved by performing the above-mentioned compensation. As the cause of the image distortion, there might be exemplified a transverse chromatic aberration and a distortion aberration arisen from a lens performance attached to the camera that has photographed the image.

A color image is formed by three primary colors of red (R), green (G), and blue (B). Since indexes of refraction (image forming magnifications) of the lens are fine different by a wavelength, the image forming magnifications of R, G, and B lights are various, namely, the transverse chromatic aberration occurs. As a result, if the image photographed on the film is reproduced, a color deviation is caused to the obtained image.

In order to acquire a preferable photographed image, it is necessary that with respect to a plane vertical to an optical axis, an image is formed on the image-forming surface corresponding to it. However, as for a normal lens, the image-forming position deviates in the optical axis direction and a distortion, that is, a distortion aberration is caused in the image-formed image, so that when the image photographed on the film is reproduced, the obtained image is distorted.

In case of using a camera for which costs to some degree might be increased such as a single lens reflex camera, by using a lens having a high precision and further by combining a plurality of lenses, various aberrations such as a transverse chromatic aberration and a distortion aberration are compensated and thereby enabling a proper image to be photographed on the film. Nevertheless, a lens-attached film or a compact camera, etc. might be severely restricted in terms of cost for the lens, with a result that the transverse chromatic aberration and distortion aberration are caused in the image photographed on the film. The image reproduced as a print might accordingly have distortions.

To solve the problem of the image quality deterioration that the image quality of the output image outputted as a photo print cannot be improved, techniques in relation to an image processing method of and an image processing apparatus for compensating an aberration of the image according to lens aberration characteristics obtained through lens information obtaining means have been disclosed in Japanese Patent Application Laid-Open No. Hei 6-311425 and Japanese Patent Application Laid-Open No. Hei 9-281613 (Japanese Patent Application No. Hei 8-92804). It is pointed out that by those techniques, aberrations due to a lens can be compensated, a deterioration of image quality in periphery of the image can be prevented, and thus an image having a high quality always can be acquired.

As mentioned above, yet, the lens of the lens-attached film is generally constructed by an inexpensive plastic lens, so that the aberrations such as a distortion aberration and a transverse chromatic aberration are large and in the film image exposed and recorded on the photographic film by the lens-attached film, a geometric distortion due to the lens distortion aberration and a color blur due to the lens transverse chromatic aberration occur relatively remarkably. Incidentally, with regard to the lens of the lens-attached film, a so-called drop in light quantity (decrease in light) in the periphery conspicuously occurs and there is also a problem that in the film image exposed and recorded on the photographic film by the lens-attached film, lightness in periphery of the image is more largely decreased than that in the center portion of the image. In the foregoing image processing system, hence, to obtain an output image having a high quality from the above-mentioned image, there is underway an examination of a contrivance that a distortion aberration compensation for compensating the geometric distortion in the image due to the lens distortion aberration, transverse chromatic aberration compensation for compensating the color blur in the image due to the lens transverse chromatic aberration, or a peripheral light decrease compensation for compensating the decrease in lightness in the periphery of the image due to drop in light in the periphery of the lens is executed.

The distortion aberration compensation can be performed as follows. When, for instance, an inherent position (lattice point position) of each pixel constituting a film image is set as a reference, distortion aberration compensating data indicative of the moving direction and moving amount at the position of each pixel due to the lens distortion aberration is preliminarily measured and stored every lens kind. For the image data as a processing target, the distortion aberration compensating data corresponding to the lens kind used in photographing is captured. On the basis of the captured distortion aberration compensation data, each pixel position, which is indicated by the data of each pixel in the case where the distortion aberration is absent, is decided. The density value at the inherent position (lattice point position) is obtained by an interpolation calculation.

The transverse chromatic aberration compensation can be further performed as follows. For example, at each position on the film image, transverse chromatic aberration compensating data, which shows the color deviation direction and the color deviation quantity of non-reference colors (e.g., R or B) for reference color (e.g., G) due to the lens transverse chromatic aberration, is preliminarily measured and stored every lens kind. For the image data as a processing target, the transverse chromatic aberration compensating data corresponding to the lens kind used in photographing is captured. On the basis of the captured transverse chromatic aberration compensating data, the position of each pixel, which is indicated by each pixel data without the transverse chromatic aberration, is decided every non-reference color. The density value at the inherent position (position similar to the that of the pixel of the reference color) is obtained by the interpolation calculation.

Furthermore, the peripheral light decrease compensation can be performed as follows. For instance, peripheral light decrease compensating data, which expresses a decreasing light quantity at each position on the film image, is preliminarily measured and stored every lens kind. For the image data as a processing target, the peripheral light decrease compensating data corresponding to the lens kind used in photographing is captured. On the basis of the captured peripheral light decrease compensating data, a fluctuating quantity in density value due to the peripheral light decrease is decided every pixel. The density value in the case where there is no peripheral light decrease is calculated every pixel.

However, when information regarding a photographic lens is not preliminarily acquired or the aberration characteristics of the photographic lens is not acquired, the compensation of the distortion aberration and transverse chromatic aberration due to the photographic lens cannot be realized by the above-mentioned techniques and the deterioration of the image quality cannot be prevented. Even if the aberration characteristics of the lens is acquired and the image having a high quality and no distortion on the basis of a compensating function and a compensating expression, the compensation of the distortion aberration is performed, so that a rectangular image 2 as shown in FIG. 18 becomes an image 4a of a pincushion form or an image 4b of a barrel form are obtained, with the compensation for the aberration characteristics done. Since the rectangular image thus becomes the image 4a of the pincushion form or image 4b of the barrel form, in order to output a predetermined rectangular image as an output print, a region 6a or outer region 8a in the image 4a of the pincushion form, or a region 6b or external region 8b in the image 4b of the barrel form needs to be outputted. On the contrary, the outer region 8a and 8b are not preferable as an output print image, because a hatched portion having no image in the output-printed image, a so-called vignetting of the image occurs. Preferably, the region 6a or 6b is enlarged to a desired print size and then outputted as a print image.

Although the inherent image, which was photographed, lies within a range of the region 4a or 4b, the region 6a or region 6b is outputted as a photo print. Thus, though the photographing was executed, the region which is not outputted as a photo print, namely, the lack of the image, a so-called vignetting of the image exists.

Particularly, if image information which is important in the region, for example, a main subject to be photographed such as a person has been photographed, the image is not outputted as a photo print and there are many cases where the head is separated in the image. If the object has been photographed by an inexpensive compact camera, etc. with a large aberration of the lens, the compensation quantity of the distortion aberration is large, so that though the photographing was executed, the region, which is not outputted as a photo print, is large and there are also many cases where the image information is not fully outputted as a photo print.

As discussed above, with respect to the compensation of the image quality deterioration due to the lens characteristics such as the distortion aberration compensation, transverse chromatic aberration compensation, and peripheral light decreasing compensation, the compensation quantity is obtained every pixel and the compensation is performed using each pixel as a unit basis. Data of each pixel, of which image data consists, therefore, has to be accurately corresponded to the compensation quantity every pixel obtained from each compensating data. If the correspondence is inaccurately executed, the compensation is performed under the compensation quantity which is different from the compensation quantity predetermined for each pixel data. Thus, the geometric distortion of the image representing the image data, color blur, and drop in lightness in the periphery of the image are unsolved. It is additionally fear that the geometric distortion, color blur, and drop in lightness in the periphery of the image might be oppositely large. In fact, there is not established a technique, in terms that in order to correspond accurately and easily, for the image data obtained by reading the image, using by which reference, data of the individual pixel might be corresponded to the compensating amount of every pixel.

SUMMARY OF THE INVENTION

To solve the above-mentioned problems of the prior art, it is a primary object of the present invention to provide an image processing method and an image processing apparatus for executing the method wherein even if lens characteristics cannot be obtained, aberrations such as a transverse chromatic aberration and a distortion aberration can be compensated and further, a proper compensating process of the aberrations can be performed in consideration of a vignetting of an image so that important image information such as a main subject to be photographed is necessarily outputted as a photo print.

It is a secondary object of the present invention, which might be accomplished in view of the above-mentioned fact, to obtain an image processing apparatus, in which for image data obtained by reading an image recorded on a recording material, a deterioration of image quality due to the lens characteristics can be compensated with a high precision.

To attain the primary object, according to a first aspect of the present invention, there is provided an image processing method, characterized in that:

obtaining input image data from an image optically photographed by using a photographic lens; and executing a compensating process using position information of the image for at least one aberration of a chromatic aberration of magnification and a distortion aberration of the input image data; wherein:

a compensating level of the aberration is first set to an initial value, an aberration compensation result is displayed on a monitor after subjecting the input image data to the compensating process for the aberration, and an compensating level is allowed to be capable of designating with respect to the initial value at a plurality of stages; and each time when one of the plurality of stages is designated, the compensating process for the aberration is again executed for the input image data according to the compensating level of a designated stage, and the aberration compensation result is displayed on the monitor.

In this instance, it is preferable that the initial value is a default value, and the compensating level is designated in such a manner that a plurality of compensating coefficients of a compensating function for at least one aberration of the chromatic aberration of magnification and the distortion aberration, which is preset in accordance with the default value or an aberration pattern corresponding to the image, are prepared for the default value, and one of the plurality of compensating coefficients is designated.

It is also preferable that the initial value is a compensating value which is automatically determined by pixel position information of the image and lens characteristics of the photographic lens, or a compensating value which is determined by an instruction of the operator; and the compensating level is designated in such a manner that a plurality of compensating coefficients of a compensating function for at least one aberration in compensating functions of the chromatic aberration of magnification and the distortion aberration, which is set according to the lens characteristics of the photographic lens, or designated by an instruction of the operator, are prepared for the compensating value and one of the plurality of compensating coefficients is designated.

It is further preferable that the compensation of at least one aberration of the chromatic aberration of magnification and the distortion aberration is performed in at least one direction of a first direction of the image and a second direction orthogonal to the first direction. Furthermore, preferably, the aberration is subjected to the compensating process in accordance with the designated compensating level, the compensation result displayed on the monitor is canceled and returned to the image data in a state of the aberration compensation result in which the compensating level is the initial value or the input image data in a state before the aberration compensation.

It is still further preferable that an unprintable quantity, which is caused as a result of the aberration compensation, is calculated in accordance with the designated compensating level, to display on the monitor a printable effective area together with the aberration compensated image.

It is yet further preferable that, prior to the compensating process for at least one aberration of the chromatic aberration of magnification and the distortion aberration, the image before the aberration compensating process is displayed on the monitor on the basis of the input image data and a print area is designated;

the compensating process of the aberration, for which the compensating level is changed at a plurality of stages in the designated print area, is executed; and the compensating process, in which the aberration compensation is maximum, is executed.

It is also still further preferable that the initial value is zero.

According to a second aspect of the present invention, there is provided an image processing method, comprising the steps of:

obtaining input image data from an image optically photographed by using a photographic lens; and executing a compensating process using position information of the image for at least one aberration of a chromatic aberration of magnification and a distortion aberration of the input image data, wherein:

the compensation of the aberration is executed by designating a print area from the photographed image region, by calculating a compensating coefficient of a compensating function of the aberration from a vignetting quantity of image, which is determined from the designated print area, and by using the calculated compensating coefficient and the compensating function of the aberration.

According to a third aspect of the present invention, there is provided an image processing apparatus, in which input image data is obtained from an image optically photographed by using a photographic lens and a compensating-process is executed using position information of the image for at least one aberration of a chromatic aberration of magnification and a distortion aberration of the input image data, comprising:

an image display device for displaying the image after the aberration has been compensated on the basis of the input image data;

means for obtaining an initial value of a compensating level of the aberration;

means for designating the compensating level obtained by the obtaining means at a plurality of stages; and means for compensating the aberration according to the initial value of the compensating level obtained by the obtaining means or the stage of the compensating level designated by the designating means, characterized in that the compensating process for the aberration is performed by the compensating means in accordance with the initial value of the compensating level obtained by the obtaining means, to display the compensation result on the image display device, and thereafter, the designating means designates the stage of the compensating level from the displayed compensated image, and performs the compensating process for the aberration according to the designated stage of the compensating level, to display the compensation result on the image display device.

However, in the compensation for deterioration of the image quality due to the lens characteristics, which is the secondary object, it is considered that as for a reference that data of a plural kind, which has a 2-dimensional stretch, can be easily corresponded, it is exemplified that if an outer edge of an image recorded to a recording material is rectangular, a corner portion or one side among four sides composing the outer edge of the image is used as the reference and data of the plural kind is accurately corresponded to the reference. In particular, in a simple camera (projecting and recording apparatus) such as a lens-attached film, there is a case where a shape of the outer edge of the image recorded to the recording material, e.g., a photographic film, etc. is distorted and even if the corner portion or side is used as a reference, data of the plural kind cannot be corresponded. The inventor of the application concerned, in consequence that an experiment has been implemented by using various references as a reference of the correspondence, has confirmed that if the center position of the image is used as a reference, the compensation (compensation based on a pixel unit basis) for the image quality deterioration due to the lens characteristics is performed for most images with high precision.

Under the foregoing, an image processing apparatus according to a first embodiment in a fourth aspect of the present invention, comprising:

calculating means for discriminating a picture position of an image on a recording material on the basis of data obtained by reading the recording material to which the image has been projected and recorded through a lens, and for calculating a center position of the image on the basis of the determined picture plane position;

means for obtaining information relating to characteristics of the lens; and means for compensating, on the basis of the information relating to the characteristics of the lens obtained by the obtaining means, a deterioration of an image quality due to the characteristics of the lens in the image indicated by image data with the center position of the image calculated by the calculating means as a reference for the image data of the image.

According to the present aspect of the invention (the first embodiment), the calculating means decides the picture plane position in the image on the recording material on the basis of data obtained by reading the recording material, on which the image has been projected and recorded through the lens, and calculates the center position of the image on the basis of the determined picture plane position. The center position in the image can be acquired by a relatively simple calculation. For instance, as shown in a second embodiment of the present aspect of the invention, on the basis of the determined picture plane position, the calculating means calculates a position, as a center position in the image, the position along a first direction almost parallel to two sides among four sides constituting an outer edge of the picture plane being located at a center of both edge portions along the first direction in the picture plane, and a position along a second direction orthogonal to the first direction, which locates at a center of both edge portions along the second direction in the picture plane.

The obtaining means obtains the information concerned with the characteristics of the lens used when the image has been projected and recorded on the recording material. It is sufficient that the information in relation to the lens characteristics is information showing the lens characteristics themselves, information showing the compensating value for compensating the image data according to the lens characteristics, information showing a lens kind, or information showing a kind of apparatus (camera, etc.) whereby the image has been projected and recorded on the recording material. As information in relation to the lens characteristics, if information showing the lens kind, or information showing the kind of projecting and recording apparatus (the lens kind can be decided from the information) is obtained, the lens characteristics and the compensating value for compensating the image data according to the lens characteristics can be decided indirectly from the obtained information.

On the basis of the information i n relation to the lens characteristics obtained by the obtaining means, the compensating means compensates the deterioration of the image quality due to the lens characteristics in the image, which the image data indicates, by using, as a reference, the center position in the image calculated by the calculating means, for the image data of the image [which can be data extracted out from the data obtained by reading the recording material (data used in the decision of the picture plane position and the calculation of the center position) or can be data obtained by again reading the image]. The compensation, which uses the center position of the image as a reference, can be executed as follows, specifically. For example, coordinates of each pixel of the image data is standardized by use of the center position in the image as a reference. For the image data after standardization, the compensating quantity for each pixel is decided on the basis of the coordinates of each pixel. The compensation can be performed on a pixel unit basis.

As described above, in the present aspect of the invention, the center position of the image is calculated and the deterioration of the image quality due to the lens characteristics, by using the calculated center position as a reference, is compensated. Hence, the deterioration of the image quality due to the lens characteristics can be compensated with a high precision for the image data obtained by reading the image recorded on the recording material.

In a third embodiment of the present aspect of the invention, it is preferable that the calculating means, on the basis of preliminary read data obtained by preliminarily reading the recording material by a predetermined resolution, calculates the center position of the image, and the compensating means performs the compensation for main reading data, obtained by a main reading operation for reading the recording material by a resolution higher than the predetermined resolution.

When image contents of an image which has been projected and recorded on a recording material are indefinite or the like, to precisely read a recording material (image), there are many cases where the recording material is preliminarily read by a relatively low resolution, a reading condition upon main reading operation is determined on the basis of the preliminary read data obtained by the preliminary reading operation, and the main reading operation for reading the recording material by a relatively high resolution according to the determined reading condition is performed. As mentioned above, when the preliminary reading operation and main reading operation are executed for the recording material, as shown in the third embodiment, if the center position of the image is calculated on the basis of the preliminary read data , the center position in the image can be calculated for a short period of time.

Although with regard to the decision of the picture plane position, various methods have been conventionally devised, if any one method is used, the picture plane position often cannot be decided accurately (e.g., an image which has been exposed and recorded to a negative film through an over-under exposure). Therefore, according to a fourth embodiment of the present aspect of the invention, in the first embodiment, there is provided an image processing apparatus further comprising:

display means for displaying the image;

display control means for displaying the decision result of the picture plane position obtained by the calculating means on the display means; and input means for inputting information instructing a compensation for the decision result of the picture plane position displayed on the display means, characterized in that when the information instructing the compensation for the decision result of the picture plane position is inputted through the input means, the calculating means compensates the decision result of the picture plane position according to the instruction and calculates the center position on the basis of the compensated picture plane position.

In the fourth embodiment, the decision result of the picture plane position by the calculating means is displayed to the display means and if the information instructing the compensation for the decision result of the picture plane position is inputted through the input means, the decision result of the picture plane position is compensated according to the instruction and the center position is calculated on the basis of the compensated picture plane position. Consequently, even if the picture plane position of the image is erroneously decided, decrease in compensating precision for the deterioration of the image quality due to the lens characteristics can be prevented.

BRIEF DESCRIPTION OF THE DRAWINGS

In the accompanying drawings:

FIG. 3 is a plan view of a film, set in the image reading apparatus of the digital photo printer shown in FIG. 1;

FIGS. 8A to 8C are examples of a picture plane displayed to a monitor of the image processing apparatus according to the present invention which implements the image processing method according to the present invention, respectively;

FIGS. 9A and 9B are other examples of the picture plane displayed to the monitor of the image processing apparatus according to the present invention that implements the image processing method according to the present invention, respectively;

FIG. 10 is a schematic block diagram of an embodiment of a digital laboratory system including the image processing apparatus according to the present invention;

FIG. 13 is a block diagram showing functions for an auto setup engine and a personal computer of the image processing unit shown in FIG. 12 separately every block and also showing an internal construction of an image processor;

FIGS. 15A and 15B are flowcharts showing an example of contents of a pre-scan process which is executed in the image reading apparatus shown in FIG. 1 and in the image processing apparatus according to the present invention;

DETAILED DESCRIPTION OF THE PREFERRED EMBODIMENTS

An image processing method according the present invention and an image processing apparatus which implements the method will hereinbelow be described in detail by way of preferred embodiments in conjunction with the accompanying drawings.

An image processing method of the first and second aspects according to the present invention and an image processing apparatus of the third aspect according to the present invention will first be explained with reference to FIGS. 1 to 9B.

Figure 1:
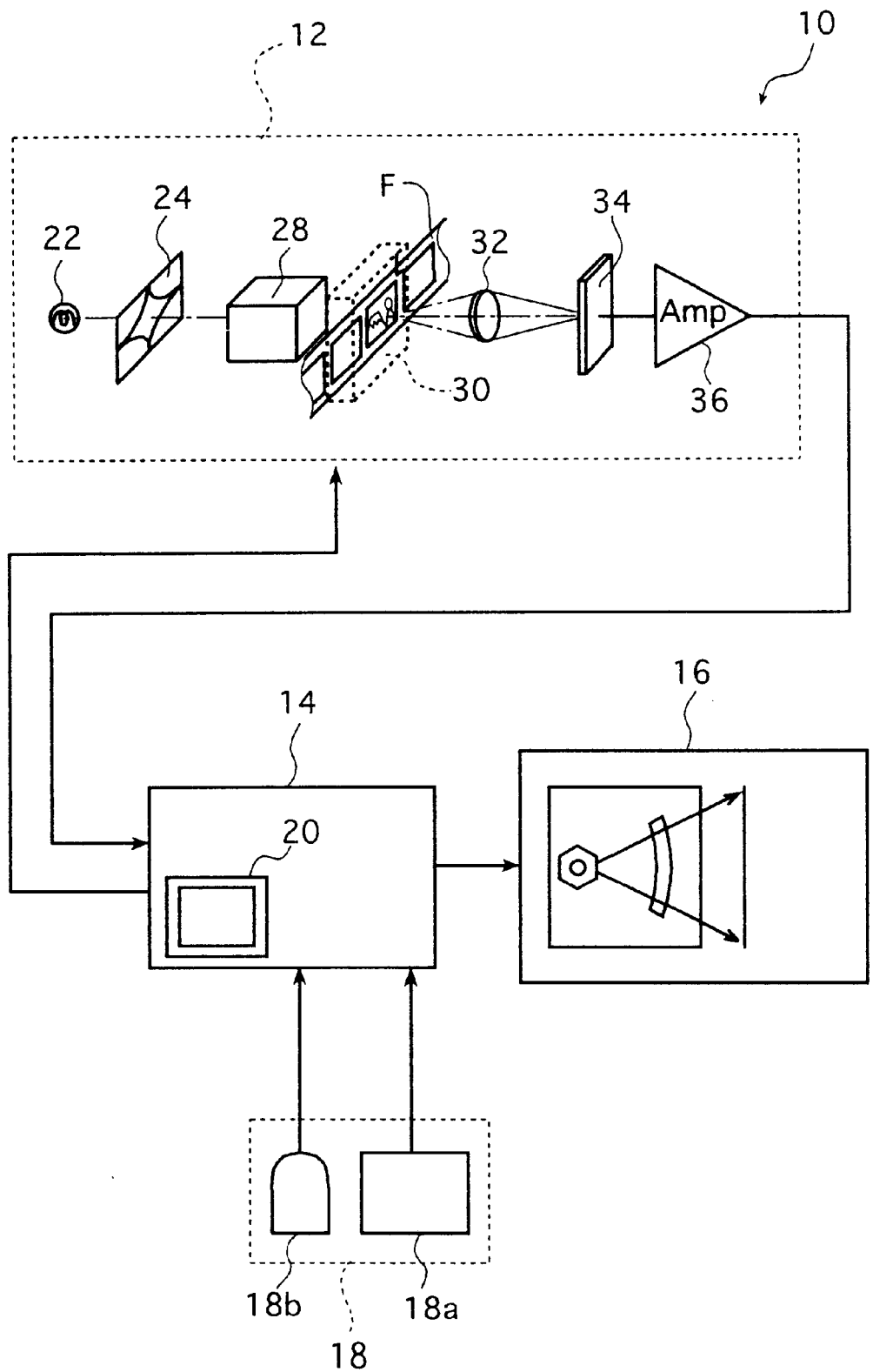
FIG. 1 is a block diagram of an embodiment of a digital photo printer to which an image processing apparatus according to the present invention that implements an image processing method according the present invention is applied.

FIG. 1 shows a block diagram of an example of a digital photo printer using the image processing apparatus of the third aspect according to the present invention which implements the image processing method of the first and second aspects according to the present invention.

A digital photo printer 10 as shown in FIG. 1 basically comprises: a scanner (image reading apparatus) 12 for photoelectrically reading an image photographed on a film F; an image processing apparatus 14 for executing image processing upon the read image data (image information) and operating and controlling the photo printer 10 as a whole, etc.; and a printer 16 for image-exposing a photosensitive material by a light beam modulated corresponding to output image data outputted from the image processing apparatus 14, then effecting a developing process thereon, and outputting the thus developed photosensitive material as a (finished) print.

The image processing apparatus 14 includes a monitor 20, which is used for designating the compensating level by the operator by seeing the read image by the scanner 12, displays various operational indications and conditions in a variety of categories setting/registering picture plane, etc. Connected also to the image processing apparatus 14 is an operation system 18 having a keyboard 18a and a mouse 18b through which to input (set) a variety of conditions such as adjusting a compensating level, and input a selection or instruction of a process and an instruction such as compensating a color and a density.

The scanner 12 is a device for photoelectrically reading the image photographed on the film F, etc. The scanner 12 has: a light source 22; a variable stop 24; a diffusion box 28 for uniformizing in a plane direction of the film F the reading light beams incident upon the film F; an image-forming lens unit 32; a CCD sensor 34 serving as a photo sensor for reading the image; and an amplifier 36. Furthermore, the scanner 12 is provided with a dedicated carrier 30 attachable to a body of the scanner 12.

Figure 2A:
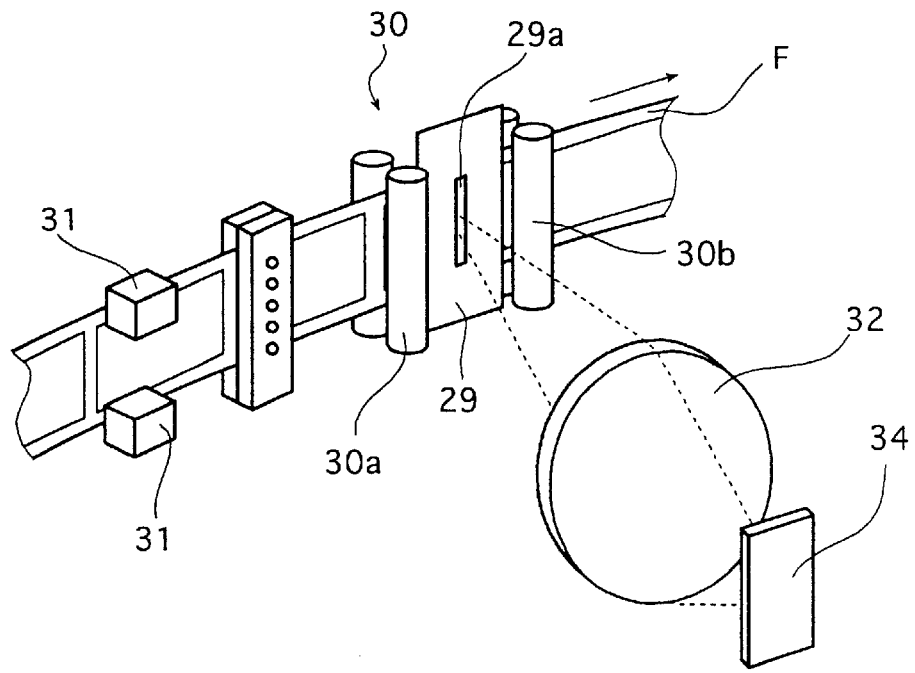
FIG. 2A is a perspective view schematically showing an embodiment of a main portion of an image reading apparatus used in the digital photo printer shown in FIG. 1.

With respect to the carrier 30, there are adopted various dedicated carriers corresponding to a long film such as a 135-size film (24 exposures), a cartridge of an APS (Advanced Photo System), aand a lens-attached film. As schematically shown in FIG. 2A, the carrier 30 includes a couple of carrier rollers 30a and 30b, disposed at the predetermined reading position set therebetween in a sub-scan direction, for carrying the film F, while being located in the predetermined reading position, in the sub-scan direction orthogonal to an extending direction (main scan direction) of the line CCD sensor of the CCD sensor 34, with the longitudinal direction of the film F being coincident therewith. The carrier 30 also includes a mask 29 having a slit 29a, disposed corresponding to the reading position and extending in the main scan direction, for defining in a predetermined slit shape the projection light beam on the film F, and further includes a magnetic reading and writing apparatus 31.

Figure 2B:
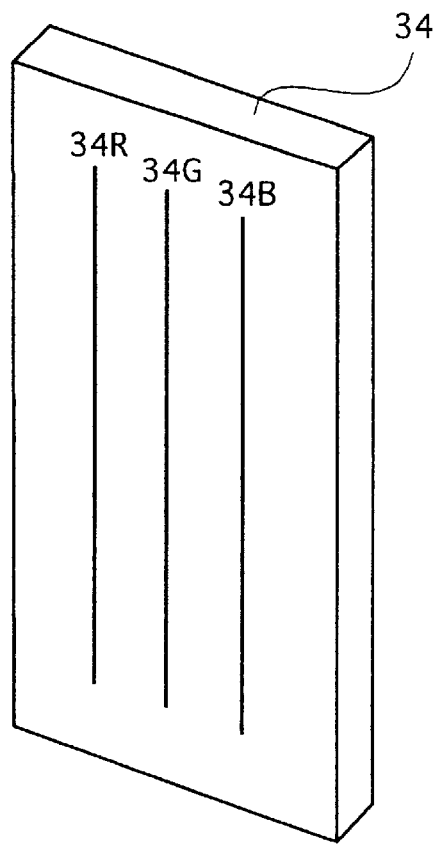
FIG. 2B is a schematic diagram showing a layout of an embodiment of CCD line sensors used in the image reading apparatus shown in FIG. 2A.

The CCD sensor 34, as schematically shown in FIG. 2B, is classified as a line sensor including a line CCD sensor 34R for reading an R-image, a line CCD sensor 34G for reading a G-image, and a line CCD sensor 34B for reading a B-image. Each line sensor extends in the main scan direction according to the order of R, G, and B. The projection light beam on the film F is separated into three primary colors R, G, and B through the CCD sensor, thereby being photoelectrically read.

In advance of an image reading operation (main scan) to output a print P, in order to determine image processing conditions, etc., the pre-scan for reading the image with a low resolution is executed, the image processing conditions are determined, further, after the operator adjusted and confirmed visually through the monitor 20, and the main scan for reading the image with a high resolution is performed, so that the reading operation of the image through the CCD sensor 34 in the scanner 12 is executed twice, that is, the pre-scan and main scan are executed.

On pre-scan, the reading light beam emitted from the light source 22, of which a light quantity is controlled by the variable stop 24, uniformized through the diffusion box 28, falls upon and penetrates the film F located and carried to the predetermined reading position by the carrier 30, thereby obtaining a projection light beam bearing the image photographed on the film F.

The projection light beam on the film F forms an image on the light receiving surface on the CCD sensor 34 through the image-forming lens unit 32, is photoelectrically read by the CCD sensor 34. Output signals of the CCD sensor 34 are amplified by the amplifier 36, and transmitted, as input image data, to the image processing apparatus 14. A series of those operations is not executed every photographed frame, but at a stretch, a roll of film is read at a constant speed and continuously.

When regardless of distinction of image frame individually, the film F is continuously read at a constant speed and at a stretch, say in case of the advance photo system shown in FIG. 3, a region S1 at the edge of the film F and bar codes printed on a region S2 at the leading and trailing portions of the respective frames G1 and G2, etc. are simultaneously read by the CCD sensor 34. Depending on a lens-attached film photographed through a lens with a large aberration, since the photographic lens is pre-known, to the region S1 shown in FIG. 3, an identification code of a lens type is latent-printed as a part of a lot code of the film every used lens type, and after developing, the bar codes might be displayed on the film F. Therefore, at the time of pre-scan to read the image through the scanner 12, not only the image but also the bar codes can be read and thus a photographic lens type identification code can be obtained.

In the film of the advanced photo system shown in FIG. 3, a magnetic recording layer is formed to the region S2 at the leading and trailing portions of the respective frames G1 and G2, etc. on the film F, on the rear surface (non-emulsification agent) thereof. As magnetic recording information, photographic lens information and image photographing time can be recorded thereon. Upon pre-scan, using the magnetic reading and writing apparatus 31 shown in FIG. 2A, the recorded magnetic information is read and the read information is transmitted to the image processing apparatus 14. As a result of those operations, various information such as a kind of photographic lens, a lens type identification code can be acquired.

Various information, e.g., a kind of lens used to photograph from an IC memory, which is attached to a cartridge FC, and a lens type identification code can also be acquired.

On main scan as well as pre-scan, the reading light beam emitted from the light source 22, of which a light quantity is controlled by the variable stop 24, uniformized through the diffusion box 28, falls upon and penetrates the film F located in the predetermined reading position and carried by the carrier 30, thereby obtaining a projection light beam bearing the image photographed on the film F.

The projection light beam on the film F forms an image on the receiving light surface of the CCD sensor 34 through the image-forming lens unit 32, and photoelectrically read by the CCD sensor 34. Output signals thereof are amplified and transmitted to the image processing apparatus 14 as input image data. A series of those operations, different from the pre-scan, is executed every photographed frame on the basis of the center position information of each image frame obtained upon the pre-scan, which will be described.

Figure 4:
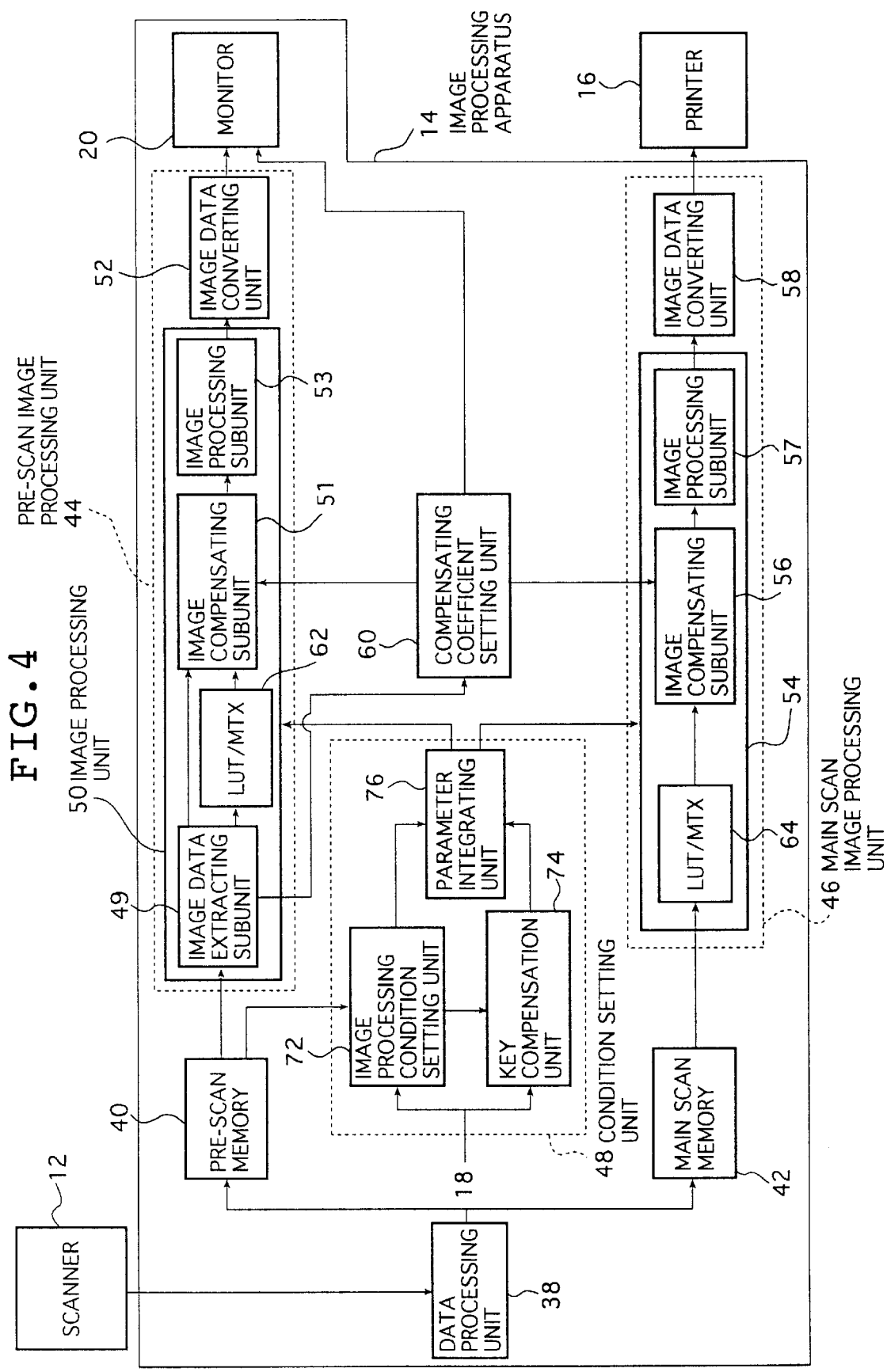
FIG. 4 is a block diagram showing an embodiment of the image processing apparatus according to the present invention applied to the digital photo printer shown in FIG. 1.

FIG. 4 shows a block diagram of an embodiment of the image processing apparatus 14.

The image processing apparatus 14 for performing a predetermined image process to the input image data acquired through the scanner 12 and outputting the processed image to the printer, comprises: a data processing unit 38; a pre-scan memory 40; a main scan memory 42; a pre-scan image processing unit 44; a main scan image processing unit 46; a condition setting unit 48; and a compensating coefficient setting unit 60.

In the data processing unit 38, output signals of R, G, and B outputted from the scanner 12 are subjected to an A/D (analog/digital) conversion, a Log conversion, a DC offset compensation, a dark-time compensation, and a shading compensation, etc., thereafter converting into digital image data. On the one hand, the pre-scan (image) data is saved (stored) in the pre-scan memory 40, and on the other hand, the main scan (image) data is saved (stored) in the main scan memory 42.

Although in the apparatus shown as an example, the input image data from the scanner 12 is A/D converted by the data processing unit 38 in the image processing apparatus 14, the present invention is not limited thereto. The analog image data can also be A/D converted by the scanner 12 and the digital image data can be inputted to the image processing apparatus 14 (data processing unit 38). The image obtained by photographing by a digital camera, etc. is inputted as digital image data, so that it is preferable that in case of using a common input method, the image signal is A/D converted by the scanner 12.

The input image data processed by the data processing unit 38 is saved into the pre-scan memory 40 and the main scan memory 42. According to the necessity, in order to perform the image process and output, the saved data is called to the pre-scan image processing unit 44 or the main scan image processing unit 46.

The pre-scan image processing unit 44 comprises an image processing unit 50 and an image data converting unit 52. The image processing unit 50 has: an image data extracting subunit 49; an LUT/MTX calculating subunit 62; an image compensating subunit 51; and an image processing subunit 53.

The image data extracting subunit 49 extracts a photographic lens type identification code as a part of a lot code from the data simultaneously captured together with the image upon pre-scan, identifies, and transmits the photographic lens type identification code to the compensating coefficient setting unit 60. The image data extracting subunit 49 detects the photographed image from data as much as one-roll film, extracts, calculates a center position of the image, and transmits to the image compensating subunit 51. The center position is calculated because a compensating expression as a compensating function used to compensate a transverse chromatic aberration and a distortion aberration, which will be explained hereinlater, is expressed as a function based on the center position of the image. The calculated center position in the pre-scan image data corresponds to the main scan image data with a certain degree precision. The correspondence is used, to thereby enable the center position in the main scan image data to be determined.

If the photographic lens type identification code serving as a part of a lot code cannot be extracted or the lens type identification code cannot be identified, data as a default is preliminary transmitted to the image compensating subunit 51, or the compensating expression serving as a compensating function of the aberration characteristics set by designating a compensating level by the operator is adopted as an aberration compensating expression and the adopted data is transmitted to the image compensating subunit 51.

The image processing by the LUT/MTX calculating subunit 62, exemplified by a color balance adjustment, a contrast compensation, and a brightness compensation is conducted. In the image compensating subunit 51, using the compensating expression based on the photographic lens characteristics determined by the compensating coefficient setting unit 60, which will be described hereinafter, a compensation of the transverse chromatic aberration, a compensation of the distortion aberration, and an enlargement/reduction of the image through an electronic zooming process are carried out. As the feature of the image processing method according to the present invention, the image compensating subunit 51 implements, so as to aberration-compensate the scanned image, a processing method of compensating the transverse chromatic aberration and distortion aberration by the compensating expression adjusted by designating one of compensating levels having a plurality of stages, while seeing the image displayed to the monitor 20. The image compensating subunit 51 also effects a processing method of designating a print area, namely, an output region of a photo print, calculating an unprintable quantity, which is determined by the designated region, i.e., an image vignetting quantity, calculating a compensating coefficient used for the compensating expression on the basis of the thus calculation, and compensating the transverse chromatic aberration and distortion aberration under the compensating expression using the compensating coefficient. In the image processing subunit 53, the image compensating subunit 51 compensates the aberration in the image data and executes the electronic zooming process, etc., and thereafter, performs the sharpness process and the dodging process, etc. in response to the instruction by the operator. The image data converting unit 52 converts the image data subjected to the image process in the image processing unit 50, using a 3D (3-dimension)-LUT, etc., for the purpose of processing the image data to the image data corresponding to the display to the monitor 20.

The main scan image processing unit 46 is constructed by an image processing unit 54 and an image data converting unit 58. Moreover, the image processing unit 54 is subdivided into an LUT/MTX calculating subunit 64, an image compensating subunit 56, and an image processing subunit 57.

In the LUT/MTX calculating subunit 64, the main scan image data is subjected to, under the image processing conditions determined for the pre-scan image data, a color balance adjustment, a contrast compensation (gradation processing), and a brightness compensation through the process by an LUT (look-up table) and a saturation compensation is implemented through the MTX calculation by the well-known method. The image compensating subunit 56 compensates the transverse chromatic aberration and distortion aberration by use of the compensating expression determined for the pre-scan image data and performs the image process through the electronic zooming process. The image processing subunit 57 executes the sharpness process and dodging process, etc., in response to the instruction by the operator.

The image data converting unit 58 converts the image data subjected to the image process through the image processing unit 54 by use of the 3D (3-dimension)-LUT, etc., so as to process the image data to output image data to output as a photo print to the printer 16.

The condition setting unit 48 is used for reading the pre-scan image data out of the pre-scan memory 40 and deciding image processing conditions.

More specifically, the condition setting unit 48 creates a density histogram and calculates a quantity of image characteristics such as an average density, an LATD (large Area Transmission Density), a highlight (lowest density), and a shadow (highest density) under the pre-scan image data. The condition setting unit 48 sets the image processing conditions such as the operation of the table (LUT) used for a grey balance adjustment, etc. and of a matrix calculation for performing the saturation compensation in accordance with an instruction of the operator, which might be given according to the necessity as well. The determined image processing conditions are, furthermore, adjusted by a key compensation unit 74, thereby resetting the image processing conditions. For the purpose of designating the compensating level and print area, which will be explained later on, a key input is used. Output conditions, i.e., a print size to output as a photo print, the number of output pixels, an electronic zooming coefficient, etc. can be designated by the keyboard 18a and the mouse 18b.

The compensating coefficient setting unit 60 stores the compensating expression and compensating coefficient for the transverse chromatic aberration and distortion aberration every photographic lens type identification code. The compensating expression and compensating coefficient for the transverse chromatic aberration characteristics and distortion aberration characteristics of the lens corresponding to the photographic lens type identification code, which has been extracted and identified, are loaded to the image data extracting subunit 49, and thereafter obtaining the compensating expression and compensating coefficient.

Herein, it is specifically assumed that the compensating expression is an expression such that in the case where the first direction and the second direction of the photographed image are an x-direction and a y-direction, individually, and a position in the image is indicated as position coordinates (x, y) of the image, compensating quantities Dx in the x-direction and Dy in the y-direction are represented as a polynomial expression of high degree, based on x and y, and a compensating coefficient is a coefficient in each member, concerning to the polynomial expression. It is to be noted that a compensating expression and a compensating coefficient are not confined to what are represented as a polynomial expression of high degree and a coefficient thereof in the present embodiment. Assumed that the compensating level determines a compensating coefficient in compliance with size of the compensating level and sets an intensity of the compensation for aberration.

If the photographic lens type identification code cannot be extracted or the lens type identification code cannot be identified, data as a default has been already set, or the compensating expression determined in the instruction by the operator has been already acquired in the image data extracting subunit 49. Since the compensating expression having the obtained compensating coefficient is a compensating expression based on a millimeter unit basis, in order to coincide the compensating expression with the compensating expression based on a pixel unit basis of the output image, the compensating coefficient based on a pixel unit of the output image outputted as a photo print, which is designated under the number of input pixels of the scanner 12, output size of a photo print, the number of output pixels of a photo print, and electronic zooming rate, is calculated and the compressing expression is acquired. Further, if the compensation for the lens aberration is performed, the vignetting of the image in which the photographed image is absent in the peripheral region of a rectangular image is caused. The image is thus enlarged by an electronic zooming coefficient larger than that of a preset one and also the coefficient is fine adjusted to the minimum enlarging coefficient, which does not enlarge unnecessarily so as to set the image into a desired print size. The unprintable quantity, i.e., the quantity of vignetting in the image is calculated so that a fine coefficient for the enlarging coefficient is calculated.

The compensating coefficient of the compensating expression for the transverse chromatic aberration and distortion aberration is stored every lens type identification code. If necessary, a compensating coefficient of a new lens type is able to be updated through various storage mediums such as an FD (floppy disk), an MO (magnetooptic disk), or a Zip by a compensating coefficient supplying unit (not shown). Using a telephone line as well as a network such as the Internet, a compensating coefficient may be updated.

Since the compensating expression having the obtained compensating coefficient is a compensating expression based on a length basis, for example, a millimeter unit basis, in order to coincide the compensating expression with the compensating expression based on a pixel unit basis of the output image, the compensating coefficient based on a pixel unit of the output image outputted as a photo print that is designated by the number of input pixels of the scanner 12, output size of a photo print, the number of output pixels of a photo print, and electronic zooming rate is calculated, and the compressing expression is acquired. The compensating coefficient, which is determined under individual conditions i.e., the number of input pixels, output size of a photo print, the number of output pixels of a photo print, and electronic zooming rate, may be previously obtained and saved as a table, and the compensating coefficient matching the conditios may be called directly.

Note that FIG. 4 shows principally the components pertaining to the image processing, and, besides those shown in FIG. 4, the image processing apparatus 14 is provided with: a CPU for controlling and managing entirely the photo printer 10 including the image processing apparatus 14; a memory for storing information needed for the operation of the photo printer 10, etc.; means for determining a stop value of the variable stop 24 upon main scan and an accumulating time in the CCD sensor 34; and the like.

Connected to the image processing apparatus 14 via the image data converting unit 52 is the monitor 20, whereby the operator checks and determines if the image process which should be subjected to the input image data is proper, especially, if the compensation for the transverse chromatic aberration and distortion aberration is appropriate.

The image processing apparatus which implements the image processing method according to the present invention is basically constructed as above. The function and the image processing method according to the present invention will be described hereinbelow with reference to FIGS. 4 and 5.

Figure 5:
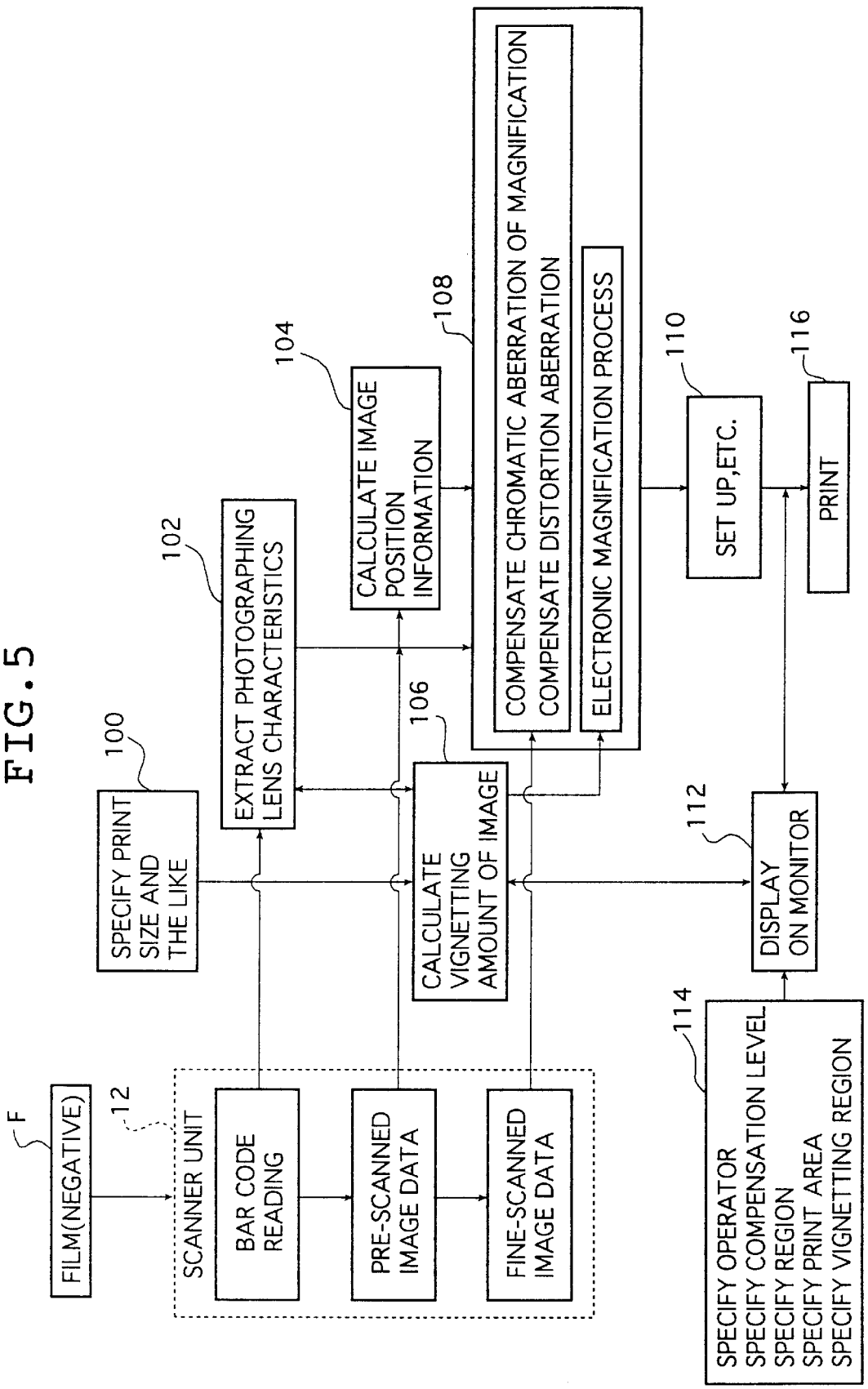
FIG. 5 is a flowchart showing an example of a flow of the image processing method according to the present invention.

FIG. 5 is a flowchart showing a schematic flow of an example of an output of a photo print according to the image processing method of the present invention, which is implemented in the digital photo printer applied to the image processing apparatus of the present invention.

Founded upon the pre-scan image data stored into the pre-scan memory 40, which is called from an image processing condition setting unit 72, a density histogram is created and a quantity of image characteristics such as an average density, an LATD (large area transmission density), a highlight (lowest density), and a shadow (highest density) is calculated. Additionally, the image processing conditions such as the operation of the table (LUT) used for the gray balance adjustment, etc., and of the matrix calculation used for performing the saturation compensation are determined in accordance with an instruction of the operator, which is given as the necessity may arise. The determined image processing conditions are, furthermore, adjusted by the key compensation unit 74, thereby resetting the image processing conditions. A parameter integrating unit 76 integrates all of the conditions and the integrated conditions are transmitted to the image processing unit 50.

By contrast, the image data extracting subunit 49 recalls the data as much as one-roll film read through the scanner 12 from the pre-scan memory 40 and identifies the photographic lens identification code in the lot code recorded to the region S1 (refer to FIG. 3) on the film F. If the photographic lens type identification code is identified, the identified code is transmitted to the compensating coefficient setting unit 60.

If the photographic lens type identification code does not exist or is not identified, data as a default is set or the compensating expression determined in response to the instruction by the operator is adopted and transmitted to the image compensating subunit 51. The data as a default is set or the compensating expression determined in response to the instruction by the operator is used because the aberration characteristics has been almost determined regardless of the photographic lens and only the intensity of the compensation is different for the most part, thereby adopting the compensating expression for compensating the aberration, which has been almost determined.

The pre-scan image data is subjected to the color balance adjustment, contrast compensation (gradation process), brightness compensation, and the like in the LUT/MTX calculating subunit 62 under the processing conditions instructed by the operator and thereafter supplied to the image compensation processing subunit 51.

On the grounds that the data called from the pre-scan memory 40 corresponds to data as much as one-roll film, the image data extracting subunit 49 detects the image data equivalent to one frame of the image from the data, sends it to the LUT/MTX processing subunit 62, and then a position information, for instance, a center position in the image is calculated (step 104 in FIG. 5). The calculation of the center position in the image data is calculated because the compensating expression used to compensate the transverse chromatic aberration and distortion aberration is expressed as a function based on the center position in the image, and also because the center position in the calculated pre-scan image data is corresponded to the main scan image data with a measure of precision and the use of the correspondence enables the center position in the image data of the main scan image data to be determined.

The position information of the calculated image is transmitted to the image compensating subunit 51 with a view to using the compensating expression for compensating the chromatic aberration of magnification and distortion aberration (step 108 in FIG. 5).

Figure 18:
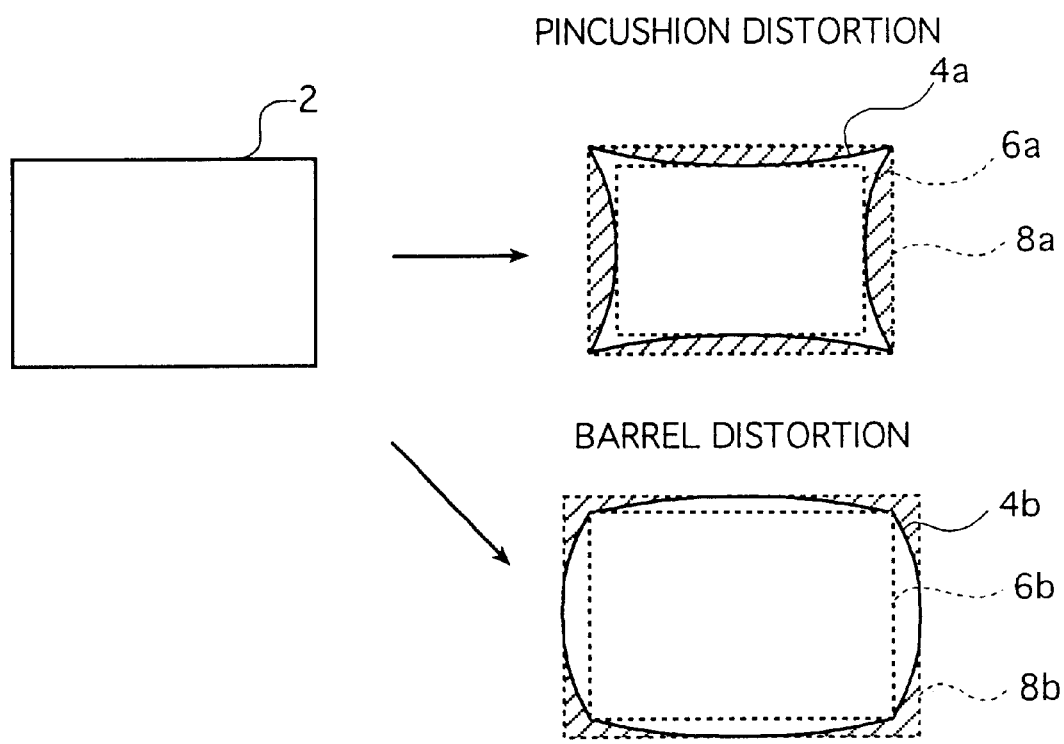
FIG. 18 is a conceptual diagram showing outer margins of an image before a distortion aberration compensation and an image thereafter.

In the compensating coefficient setting unit 60, loaded from a compensating coefficient storing unit is the compensating coefficient of the transverse chromatic aberration and distortion aberration, which is extracted from the bar codes read through the scanner 12 and associated with the photographic lens type identification code supplied to the compensating coefficient setting unit 60, and the characteristics of the photographic lens are extracted (step 102 in FIG. 5). The compensating coefficient of the recalled lens characteristics is equal to a coefficient of the function as a compensating expression for compensating the aberrations and to a compensating coefficient based on a millimeter unit basis. Thus, the compensating coefficient based on a pixel unit of the image, which is determined depending on the number of input pixels of the scanner 12, the monitor display size, the number of monitor display pixels and the electronic zooming rate, is calculated. When the distortion aberration is compensated, the vignetting of the image without the photographed image occurs in the peripheral region of the rectangular image, and in consequence, an output region of a photo print is set to the regions 6a and 6b as shown in FIG. 1 and an output frame of a photo print is displayed to the monitor 20 so that it is capable of being checked if the range of the output region of a photo print is proper. With the object of determining the range, the vignetting quantity of image, which is determined in compliance with the compensating expression, is calculated (step 106 in FIG. 5). The vignetting quantity of the image is equivalent to the number of pixels in the longitudinal direction and the number of pixels in the lateral direction in the hatched area as shown in FIG. 18.

The compensating expression of the transverse chromatic aberration and distortion aberration with the calculated compensating coefficient based on a pixel unit is transmitted to the image compensating subunit 51. The calculated vignetting quantity of the image is supplied to the monitor 20 for displaying the pre-scan image so that the operator confirms and examines it. This is the reason why the rectangular output region of a photo print, which is determined on the basis of the vignetting quantity of image, is displayed together with the pre-scan image.

In the embodiment, with respect to the pre-scan image data, the transverse chromatic aberration and distortion aberration are compensated and the rectangular output region of a photo print is displayed. However, for a speedy compensating process, instead of compensating the transverse chromatic aberration and distortion aberration, the pre-scan image subjected to the electronic zooming process and the output region of a photo print may be displayed to the monitor 20. In this instance, the pre-scan image data is not compensated, so that the output region of a photo print is not rectangular. In this case as well, because without cutting-off important photographed image information by the output of a photo print, the image can be compensated the most perfectly, which is an object of the present invention.

The pre-scan image data is subjected to a predetermined process by the LUT/MTX processing subunit 62 and after that, using the compensating expression sent from the photographic lens compensating coefficient setting unit 60, the center position of the image data transmitted from the image extracting subunit 49, and the pixel position information concerning the image to be compensated, the image aberration compensating subunit 51 executes the transverse chromatic aberration compensation, distortion aberration compensation, and electronic zooming process for the processed data (step 108 in FIG. 5) and the color deviation compensation is performed by a scanner (not shown) as the necessity may arise. Independently on whether the photographic lens characteristics can be obtained or not, it will be mentioned later on a deciding method of the compensating expression for compensating the image of the main scan image data by the use of the position information of the image.

Since the image must be enlarged and reduced by means of proper position information, the electronic zooming process has been effected after the transverse chromatic aberration compensation and the distortion aberration compensation. An electronic zooming rate K to enlarge and reduce the image data, of which transverse chromatic aberration and distortion aberration have been compensated, is calculated in dependence upon a display size of the monitor and the number of pixels, and by the use thereof, the electronic zooming process is conducted. The processed image data is supplied to the image processing subunit 53.

The method of the electronic zooming process is not specifically limited to and a variety of well-known methods can be utilized. A method adopting a bi-linear interpolation, a method adopting a spline interpolation and the like can be exemplified.

After the compensating process was executed in the image compensating subunit 51, the image data is sent to the image processing subunit 53 and then the sharpness process and dodging process, etc. are performed. The processed image data is thereafter transmitted to the image data converting unit 52, converted into the image data for monitor display, set up (step 110 in FIG. 5), and thereby being displayed to the monitor 20 (step 112 in FIG. 5).

Note that the image processing method and the image processing apparatus according to the present invention is characterized by a method whereby the compensating expression is determined by designating the compensating levels of the transverse chromatic aberration compensation and distortion aberration compensation (step 108 in FIG. 5) for the main scan image data (fine scan image data).

Displayed, in other word, to monitor 20 is the image as a compensation result, to which the aberrations has been compensated in accordance with the default value that has been set as a default, compensating value instructed by the operator or the compensating value determined depending on the lens characteristics used upon photographing. The compensating level is designated from the compensating levels a plurality of which are possible to be designated, while seeing the displayed image, and then the compensating process for transverse chromatic aberration and distortion aberration of the image to be outputted as a photo print on the basis of the compensating expression obtained by adjusting the compensating coefficient is performed. The compensating coefficient of the compensating expression for aberration is calculated from the vignetting quantity of image, determined under the designated print area, and thereafter the compensating process for transverse chromatic aberration and distortion aberration of the image, which is outputted as a photo print, is effected on the basis of the compensating expression using the calculated compensating coefficient.

Figure 6:
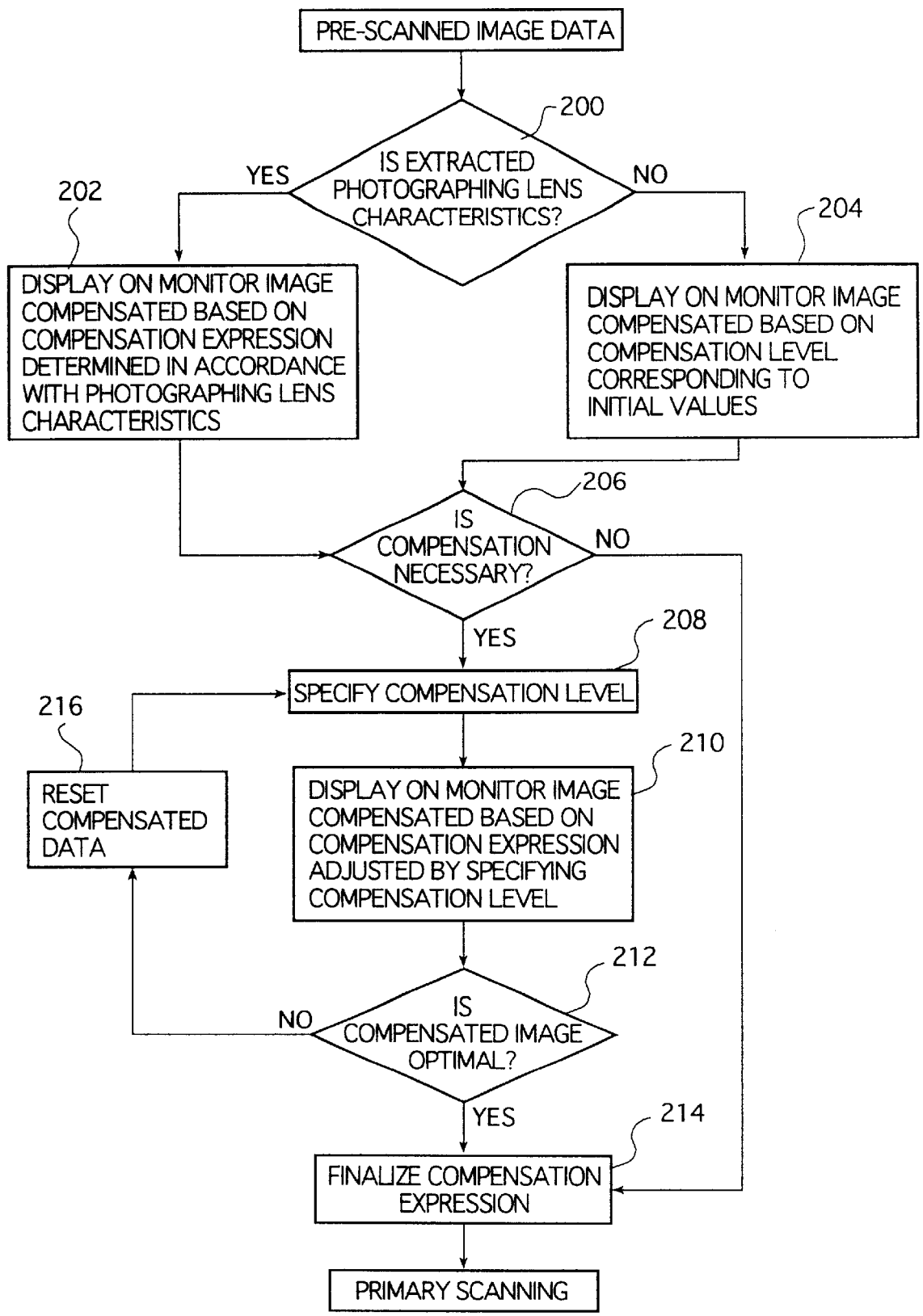
FIG. 6 is a flowchart showing in detail an example of a flow of the image processing method according to the present invention.
Figure 7:
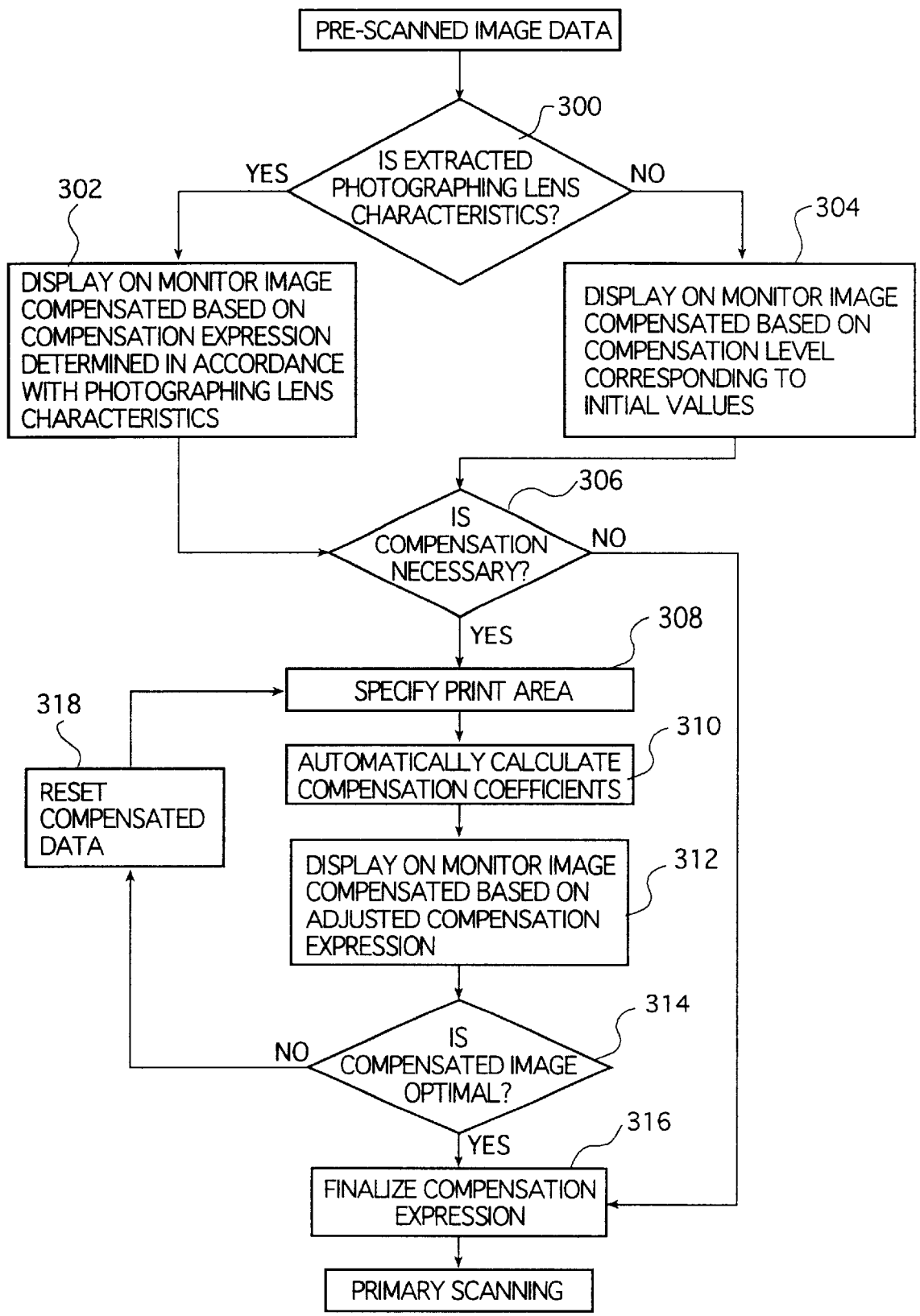
FIG. 7 is a flowchart showing in detail another example of a flow of the image processing method according to the present invention.

A flow of each compensation processing method is illustrated in FIGS. 6 and 7, respectively.

The flow of the compensating processing method in FIG. 6 will be now described.

To begin with, the bar codes as a photographic lens type identification code are read out of the pre-scan image data and it is decided whether the photographic lens characteristics are extracted or not (step 200 in FIG. 6). If YES, the image as a compensation result, based on the compensating expression determined in correspondence to the above-mentioned photographic lens characteristics, is displayed to the monitor 20 (step 202 in FIG. 6). If NO, the default value set as a default or compensating value instructed by the operator is set to an initial value and the image as a compensation result based on the compensating level corresponding to the initial value is displayed to the monitor 20 (step 204 in FIG. 6). As discussed above, the compensating expression is set to the default value or the selection is allowed by the operator because the transverse chromatic aberration characteristics and distortion aberration characteristics of the photographic lens have been almost determined and mostly, only the compensating levels thereof are different.

It is noticed in the present invention that this initial value is basically the default value and is determined automatically by the photographic lens characteristics or determined by an instruction of the operator. However, when the photographic lens characteristics are not known or the operator can not imagine the compensating quantity, firstly the image which is not compensated at all, that is, in which the initial value is set 0 may be displayed, and thereafter the compensating direction and/or quantity may be determined.

The operator decides whether the compensating level has to be designated and adjusted or not through seeing the monitor 20 (step 206 in FIG. 6). If it is determined that the adjustment is unnecessary, the compensating expression determined correspondently to the photographic lens characteristics or the compensating expression determined correspondently to the compensating level according to the initial value is determined (step 214 in FIG. 6). The determined compensating expression is set to the compensating expression for compensating process of the main scan image data. On the contrary, if it is determined that the adjustment is necessary, the compensating level is designated out of the compensating levels a plurality of which the operator can select (step 208 in FIG. 6). The compensating quantity to compensate the aberrations is divided into 3 to 5 stages and the compensating levels are adjusted. The compensating level determines a size of compensating coefficient serving as a coefficient of the compensating expression, which is utilized for aberration compensation. It is possible that the operator inputs the compensating level through the operation system 18. Since a photographic lens may has both aberration characteristics of pincushion form and that of barrel form, the compensating level is selectable. The compensating coefficient is adjusted by designating the compensating level and then, as shown in FIGS. 8A and 8B, the image as a compensation result which is based on the adjusted compensating expression is displayed to the monitor 20 (step 210 in FIG. 6). The operator visually decides if the image as a compensation result is the optimum image or favorite image and desired image (hereinlater typically termed the best image) (step 212 in FIG. 6). If YES, the compensating level is determined by the designated compensating level and to thereby be used for the compensation of the main scan image data. If NO, the image data as a compensation result is canceled and reset (step 216 in FIG. 6). The processing routine returns to the status of the automatic aberration compensation result (image data or monitor display) such as the aberration compensation result (step 202 in FIG. 6) based on the compensating expression which is determined correspondently to the photographic lens characteristics or the aberration compensation result (step 204 in FIG. 6) based on the compensating level correspondently to the initial value. Or the status before the aberration compensation (input image data or input image monitor display) is returned. After that, the compensating level can be again designated (step 208 in FIG. 6). The process for again designating the compensating level can be repeated.

With a replacement of the designation of the compensating level in step 208 in FIG. 6 and the displaying of the image as the compensation result in step 210 in FIG. 6 to the monitor, it is also sufficient in terms of preventing a main subject to be photographed from not being outputted as a photo print. That is, the print area may be designated in the image as a compensation result that is displayed in step 202 or 204 by using the mouse 18b, etc. Within the designated print area, the compensating process for the aberrations, in which the compensating level is varied at a plurality of stages, may be next executed. The image as a result of the compensating process, in which aberration compensation is maximum, may be displayed to the monitor.

According to the above-mentioned method, the compensating process for the transverse chromatic aberration and distortion aberration is implemented. In this compensating process, the image position of the photographed image is changed. A two-dimensional compensating process, however, is performed in a manner such that, based on the image data before compensating process, the compensating quantities in both of the first direction in the photographed image and the second direction orthogonal thereto are calculated once. As a substitute for the 2-dimensional compensating process, the above-explained compensating process is executed according to a one-dimensional compensating process. The 1-dimensional compensating process is performed in a manner that with regard to each of the compensating quantities in the first and second direction in the photographed image, the compensating processes for transverse chromatic aberration and the distortion aberration are conducted in the first and second direction, respectively, and 1-dimensionally.

According to the 2-dimensional compensation processing method as a prior art, the image data before the compensating process as well as the image data thereafter should be stored. As a consequence, there have arisen many problems in practice use that a required memory capacity is enormous and a processing speed is also slow. The method according to the present invention, i.e., the 1-dimensional compensating process however is implemented and thus a memory capacity can be saved, the processing speed can be improved, and a processing apparatus can be simplified. Especially, concerned with the lens-attached film, etc., when the image are concave in both of the longitudinal direction and the lateral direction (first direction) upon seeing from the photographic lens, there is a case where the aberration compensating quantity in the first direction is small and the compensation is unnecessary therein. In such a case, if the compensating process in the second direction is executed, the problems in practice use hardly occur and it is advantageous in point of processing speed. Similarly, as shown in FIG. 8C, the compensating level is changeable in the lateral direction of the image and in the longitudinal direction thereof, so that the output region of a photo print is changeable in the lateral direction and the longitudinal direction, separately, and the degree to enabling the compensating process to be freely performed becomes large. There is an advantage that the output region of a photo print is widened and also there can be provided the image having less distortion, with a high quality. Likewise, the compensating process only either in the lateral direction or in the longitudinal direction may be implemented.

Both of the image and the printing output region are simultaneously displayed to the monitor 20. In step 106 in FIG. 5, the vignetting quantity of the image is calculated in compliance with the compensating level and therefore they are capable of being displayed by use of the vignetting quantity.

The output region of a photo print is also displayed at the same time to confirm if important information e.g., main subject, etc., is contained in the range where the output region of a photo print is not performed through the compensating process for the distortion aberration.

Then, the flow of the compensation processing method shown in FIG. 7 will be described.

The compensation processing method shown in FIG. 7 may be used on behalf of the compensation processing method in FIG. 6.

To start with, the lot code including the photographic lens type identification code is read from the pre-scan image data and then it is decided whether the photographic lens characteristics are extracted or not (step 300 in FIG. 7). If YES, the image after compensation, based on the compensating expression determined in accordance with the above-mentioned photographic lens characteristics, is displayed to the monitor 20 (step 302 in FIG. 7). If NO, the default value set as a default or the compensating value instructed by the operator is set to an initial value and the image as a compensation result, based on the compensating level corresponding to the initial value, is displayed to the monitor 20 (step 304 in FIG. 7). The compensating expression thus can be set to as default or instructed by the operator for the reason that the distortion aberration characteristics and transverse chromatic aberration characteristics of the photographic lens have been almost determined irrespective of the photographic lens and only the compensating levels are different, mostly.

The operator designates the compensating level by seeing the monitor 20 and decides if the compensating level needs to be adjusted (step 306 in FIG. 7). If NO, the compensating expression is fixed. That is, it is fixed that the compensating expression that is decided in correspondence to the lens characteristics, or the compression expression that when the default value set as a default value or the compensating value instructed by the operator is set to the initial value is decided by the compensating level corresponding to the thus set initial value (step 316 in FIG. 7). After the compensating process was executed by the compensating expression determined through capturing the main scan image data, the data is outputted as a photo print. In contradistinction, if YES, the operator, seeing the monitor 20, designates the print area in the photographed image region (step 308 in FIG. 7). For instance, the range is set for the purpose of preventing the main subject from being broken off halfway. In the case where the image, of which distortion aberration has been compensated, has strong level of the compensation, the vignetting quantity of the image is increased according the compensating level. If the image is outputted as a photo print as a rectangular image, the cut-off region is large. Therefore, as shown in FIGS. 9A and 9B, the print area, which should not be cut off, is designated, and to thereby enable the compensating coefficient to be compensated within the range to be uniquely determined by the vignetting quantity of image. The output region of a photo print to be designated is, namely, determined and the compensating coefficient is automatically calculated from the designated print area (step 310 in FIG. 7). On the basis of the compensating expression adjusted by the calculated compensating coefficient, the image as a compensation result is displayed to the monitor (step 312 in FIG. 7). The operator decides whether the image as a compensation result is the best image or not, while seeing the monitor 20 (step 314 in FIG. 7). If it is the best image, the compensating expression is determined (step 316 in FIG. 7). When the image as a compensation result is not the best image, exemplarily, the print area is narrow and thus the compensation is strongly executed over and above what might be required. In such a case, it is determined that the image as a compensation result is not the best image and the data as a compensation result is canceled and reset (step 318 in FIG. 7). The data is returned to the status (image data or monitor display) of the automatic aberration compensation result such as the aberration compensation result, based on the compensating expression determined according to the photographic lens characteristics (step 302 in FIG. 7) or the aberration compensation result, based on the compensating level determined according to the initial value (step 304 in FIG. 7). Or returned to the status before the aberration compensation (input image data or input image monitor display). After that, the print area can be again designated (step 308 in FIG. 7). The main scan is subsequently executed and the main scan image data is subjected to the compensating process by the thus determined compensating expression.

In lieu of designating the print area, there may be designated a region which is capable of being cut off on the occasion of outputting the vignetting region in the image outputted as a photo print, videlicet, as a rectangular image.

During a series of compensating processes until the compensating expression is determined under the pre-scan image data, a flow from steps 208 to 216 in FIG. 6 or a flow from steps 308 to 318 in FIG. 7 may be properly selectable, in steps subsequent to step 208 or 306.

In the foregoing, the flows of the compensation processing method shown in FIGS. 6 and 7 have been explained. Although this processing method relates to a processing method of compensating the transverse chromatic aberration and distortion aberration, not only the transverse chromatic aberration and distortion aberration but also drop in peripheral light quantity due to the lens, an image out of focus, or the like may be compensated.

In the above-mentioned manner, under the pre-scan image data, the compensating expression for compensating the transverse chromatic aberration and distortion aberration is determined and by the use thereof, the main scan image data is processed.

In the main scan, different from the pre-scan, the image is read through the scanner 12 with a high resolution and under the image processing conditions determined for the pre-scan image, the main scan image data serving as input image data is subjected to the image process, thereby obtaining the output image data of a photo print.

Upon end of the pre-scan, the film F has been pull out up to the final image frame from a film cartridge FC. In the main scan, while using the rewind of the film F from such a film-state, the image frame is read. The center position in the frame on the film of each image, on this occasion, is calculated on the basis of the image center position in the pre-scan image data, so that the image is main-scanned every frame by using the center position information.

Each of R-, G-, and B-output signals outputted from the scanner 12 is subjected to the A/D (analog/digital) conversion, Log-conversion, DC offset compensation, darktime compensation, shading compensation, etc., and to thereby be converted into digital input image data. The main scan image data (fine scan image data) is saved (stored) in the main scan memory 42.

The main scan image data (fine scan data), stored in the main scan memory 42, is transmitted to the LUT/MTX processing subunit 64. Under the image processing conditions obtained by adjusting and determining the pre-scan image by the operator, various image processes are executed by the table (LUT) used for the grey balance adjustment, etc. and the matrix calculation (MTX) for compensating the saturation. The processed data is further processed by the LUT/MTX processing subunit 64 and subsequently supplied to the image compensating subunit 56.

The image compensating subunit 56 compensates the transverse chromatic aberration and distortion aberration for the main scan image data by using the compensating expression determined on the basis of the pre-scan image data and then performs the electronic zooming process. (step 108 in FIG. 5). In this case, the main scan image data is outputted as data of a photo print. In consequence, the compensating coefficient is varied according to the number of output pixels of the printer, the printer output size as an output condition set on pre-scan, and the number of pixels of the input image data, etc. The varied compensating coefficient differs from the compensating coefficient determined for the pre-scan image data to be displayed to the monitor 20. The compensating expression used for the main scan image data is calculated at a time point when the operator determines the compensating expression for the pre-scan image data. When the distortion aberration is compensated, the vignetting of the image having no photographed image in the region peripheral to the rectangular image occurs, so that the image is enlarged by an electronic zooming rate larger than a preset electronic zooming coefficient and further the rate is fine adjusted to the minimum electronic zooming rate whereby the photographed image might be over-enlarged and a part thereof is not cut off so as to set the image into a desired print size. To calculate the fine adjusting coefficient of the electronic zooming rate, the vignetting quantity in image is calculated on the basis of the output size of a photo print (step 100 in FIG. 5) and the compensating expression for compensating the aberration determined according the above-mentioned method (step 106 in FIG. 5). The calculated vignetting quantity in image is used and a fine adjusting coefficient $\alpha$ of the electronic zooming rate K, which causes no vignetting of the image, is calculated. A product $\alpha K$ of the fine adjusting coefficient a and electronic zooming rate K becomes the electronic zooming rate used for electronic zooming process to the main scan image data.

The determined compensating expression, electronic zooming rate K, and fine adjusting coefficient $\alpha$ are used and then the image data is compensated. The compensation, as discussed above, is performed from the viewpoint of saving memory capacity and improving the compensation processing speed. Namely, the compensating processes for transverse chromatic aberration and the distortion aberration are conducted, respectively and 1-dimensionally, in the first direction and in the second direction orthogonal thereto in the image, determined when obtaining the input image data from the photographed image. On this occasion, in a manner similar to that of the pre-scan image data, the compensating process only in one direction may be performed.

The image compensating subunit 56 compensates the transverse chromatic aberration and the distortion aberration. The subunit 56 then compensates the color deviation of the scanner and performs the electronic zooming process as the need may arise. The processed data is thereafter supplied to the image processing subunit 57. The image processing subunit 57 executes the sharpness process, dodging process, and the like as occasion may demand. After that, the processed data is transmitted to the image data converting unit 58 ("SET UP, ETC." in step 110 in FIG. 5).

The image data converting unit 58 image-converts the above-mentioned data into data for output to the printer and transmits to the printer 16 the converted data serving as output image data (step 116 in FIG. 5).

The printer 16 comprises: a recording apparatus (printing apparatus) for exposing the photosensitive material (photographic pringting paper) to light correspondently to the supplied output image data and recording the latent image; and a processor (developing apparatus) for executing a predetermined process to the photosensitive material serving as an exposed material and for outputting it as a print.

In the recording apparatus, the photosensitive material is cut to pieces thereof having a predetermined length according to the print. Subsequently, three kinds of light beams of R-exposure, G-exposure, and B-exposure, which correspond to spectral sensitivity characteristics of the photosensitive material, are modulated in accordance with the output image data outputted from the image processing apparatus 14 and deflected in the main scan direction. The photosensitive material is continuously conveyed in the sub-scan direction orthogonal to the main scan direction. Thus, the photosensitive material is 2-dimensionally scan-exposed to the light beams and to thereby record the latent image and supply it to the processor. The processor, which has received the photosensitive material, executes predetermined wet developing processes such as color developing, bleach-fix, and washing. The processed photosensitive material is dried, classified to a predetermined unit such as one roll of film, serving as a print, and collected.

As described above, according to the first, second, and third aspects of thepresemt invention, in order to compensate the transverse chromatic aberration and distortion aberration, there is implemented a processing method of compensating the transverse chromatic aberration and distortion aberration, on the basis of the compensating expression obtained by designating and deciding the compensating level while seeing the image displayed to the monitor and on the basis of the compensating expression obtained by designating the print area and adjusting to the optimum compensating level. Therefore, it is effective that there can be provided the image processing method of and image processing apparatus for, even if the lens characteristics could not be acquired, enabling the transverse chromatic aberration and distortion aberration to be compensated and further the proper compensating process to be performed so that the important image information, which has been photographed can be outputted as a photo print without fail.

Next, an image processing apparatus in accordance with a fourth aspect of the present invention will be described with reference to FIGS. 10 to 17B.

Described first is an embodiment of a digital labo system including the image processing apparatus according to the fourth aspect of the present invention.

(Schematic Construction of Entire System)

Figure 11:
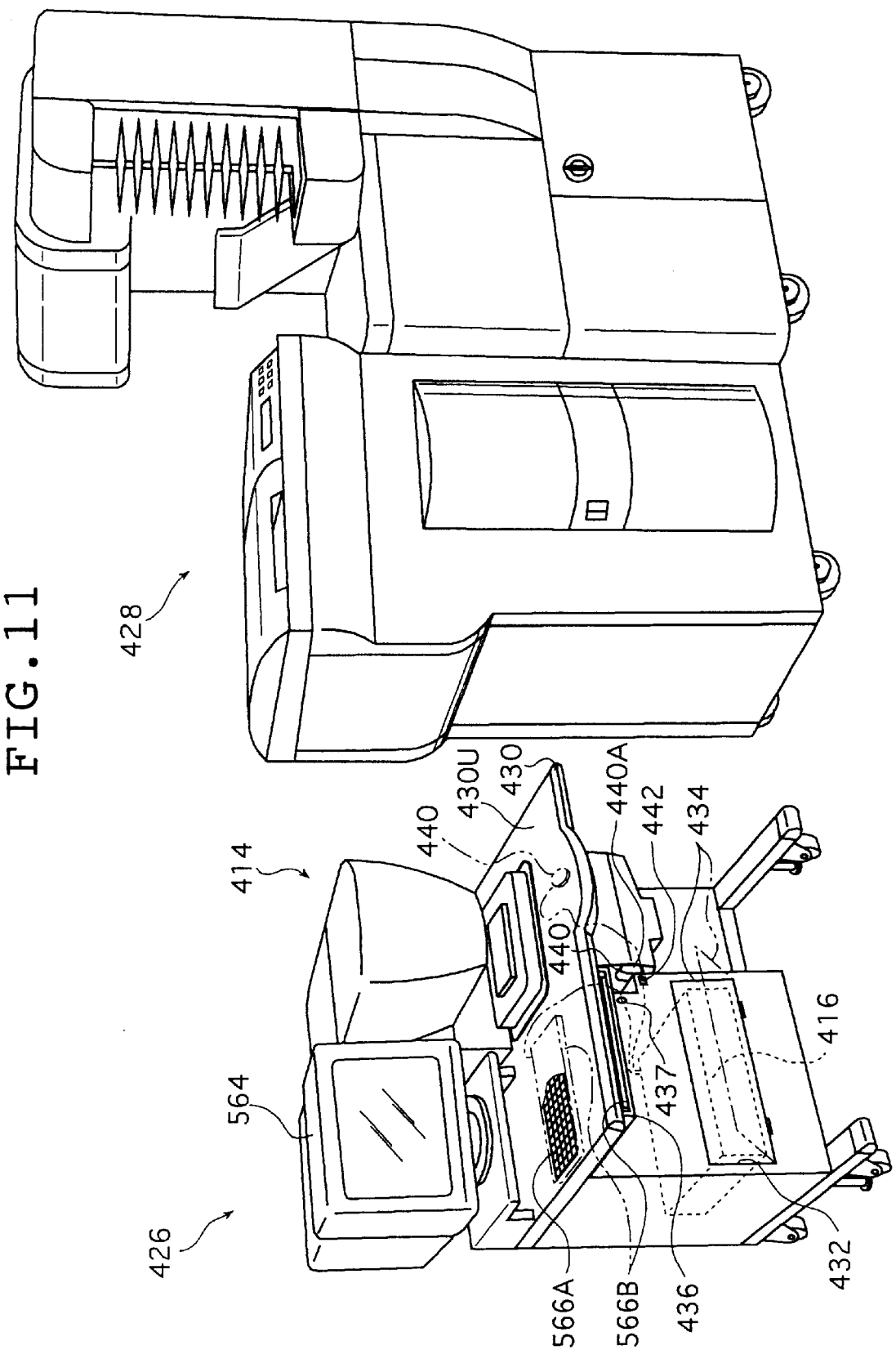
FIG. 11 is an external view of the digital laboratory system shown in FIG. 10.

FIG. 10 shows in schematic form the construction of a digital labo system 410 in accordance of a first embodiment of the present invention, and FIG. 11 shows its appearance. As shown in FIG. 10, the labo system 410 includes a line CCD scanner (hereinafter referred to simply as "scanner") 414, an image processing unit 416 which is the image processing apparatus of the present invention, a laser printer unit 418 and a processor unit 420. The scanner 414 and the image processing unit 416 are integrated into an input unit 426 shown in FIG. 11, whereas the laser printer unit 418 and the processor unit 420 are integrated into an output unit 428 shown in FIG. 11.

The scanner 414 reads a film image (a negative image or a positive image rendered visible while developed after an object has been photographed) recorded on a photographic film such as a negative film and a reversal film, and can read, e.g., a film image recorded on a 135-size photographic film, a 110-size photographic film and a photographic film having a transparent magnetic layer (a 240-size photographic film, or a so-called APS film), and a 120-size and a 220-size (Brownie size) photographic film. The scanner 414 reads these film images with a three-line color CCD sensor, and outputs image data of R, G and B colors.

As shown in FIG. 11, the scanner 414 is mounted on a work table 430. The image processing unit 416 is contained in a containing unit 432 arranged in the lower side of the work table 430. A door 434 is provided at the opening of the containing unit 432. The door 434 of the containing unit 432 is normally closed so that the interior of the containing unit 432 is concealed. When the door 434 is turned, the interior of the unit 432 is exposed, so that the image processing unit 416 becomes ready to be retrieved.

Further, a display 564 is attached to the back side of the work table 430, and two types of keyboards 566A and 566B are also provided. The keyboard 566A is built in the work table 430 so as to be embedded in the table 430, whereas the other keyboard 566B is designed so that it is put in a drawer 436 of the work table 430 during no use and taken out of the drawer 436 and put over the keyboard 566A during use. When the keyboard 566B is in use, a connector (not shown) attached to the distal end of a cord (signal line) extending from the keyboard 566B is connected to a jack 437 provided on the work table 430, so that the keyboard 566B is electrically connected to the image processing unit 416 through the jack 437.

Further, a mouse 440 is arranged on a work surface 430U of the work table 430. The mouse 440 is connected to the image processing unit 416 via a cord which extends to the containing unit 432 through a hole 442 provided on the work table 430. During no use, the mouse 440 is contained in a mouse holder 440A, whereas, during use, it is taken out of the mouse holder 440A and put on the work surface 430U.

The image processing unit 416 can input image data (hereinafter referred to collectively as "file image data") from external sources (i.e., through a recording medium such as a memory card, or from other information processing devices trough communication lines). The file image data includes image data (scanned data) outputted from the scanner 414, and image data obtained by taking a picture with a digital camera, image data obtained by reading a document other than a film image (e.g., a reflection copy and the like) with the scanner, and image data generated by a computer.

The image processing unit 416 processes the received image data for various compensations and the like, and delivers the processed image data to the laser printer unit 418 as image data to be recorded. The image processing unit 416 can also output the image-processed image data to external devices in the form of an image file (e.g., output to a recording medium such as a memory card, and transmit to other information processing devices through communication lines).

The laser printer unit 418 has laser sources for R, G and B colors, and records an image on a photographic printing paper through scan-exposure by irradiating the photographic printing paper with a laser beam modulated in accordance with the recording image data supplied from the image processing unit 416. Further, the processor unit 420 processes the photographic printing paper, on which the image has been recorded through scan-exposure by the laser printer unit 418, for such processes as color development, bleaching and fixing, rinsing, and drying. With these processes, a print image is formed on the photographic printing paper.

(Construction of the Image Processing Unit)

Figure 12:
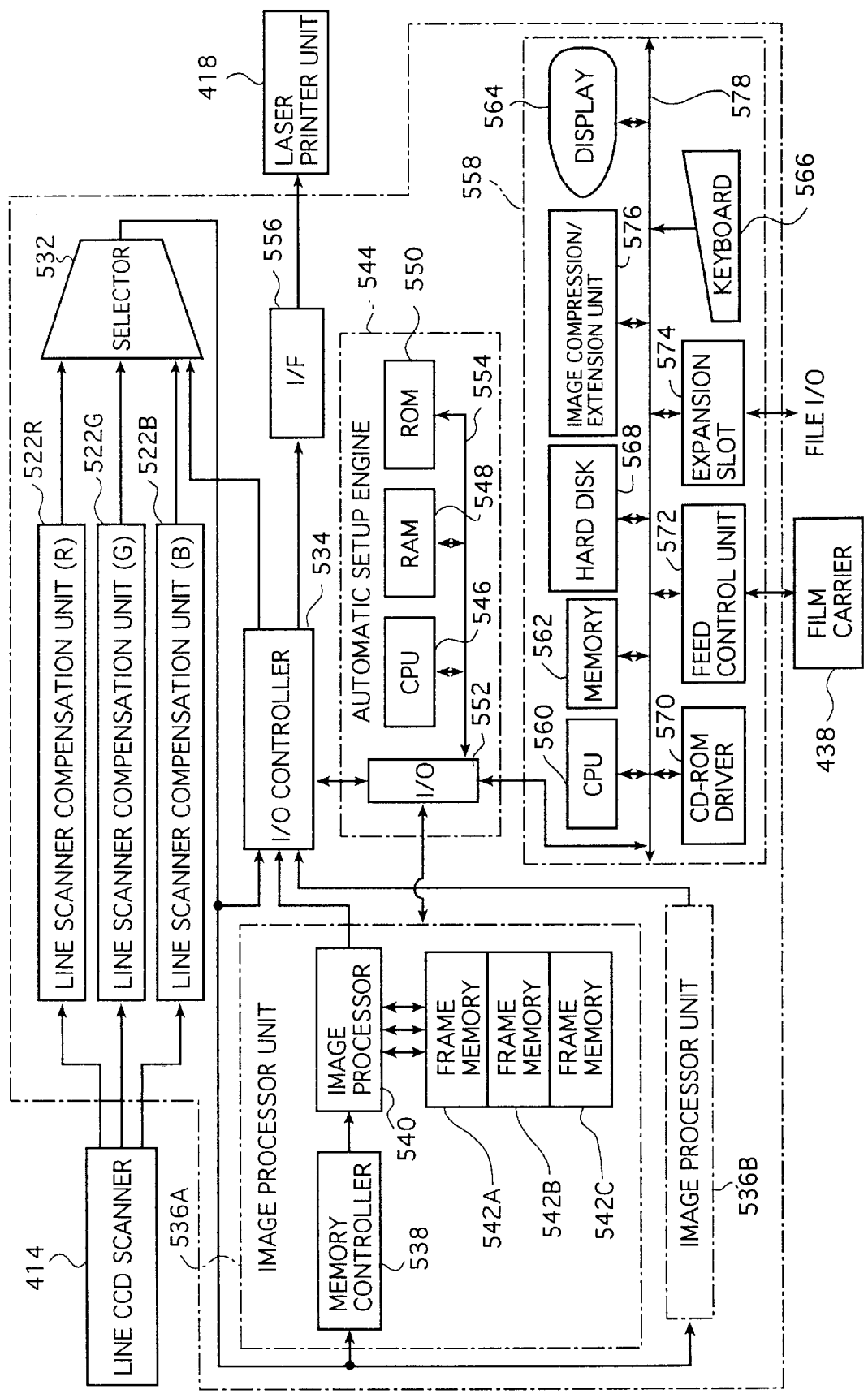
FIG. 12 is a block diagram showing a schematic construction of an embodiment of an image processing unit of the digital laboratory system shown in FIG. 10.
Figure 14A:
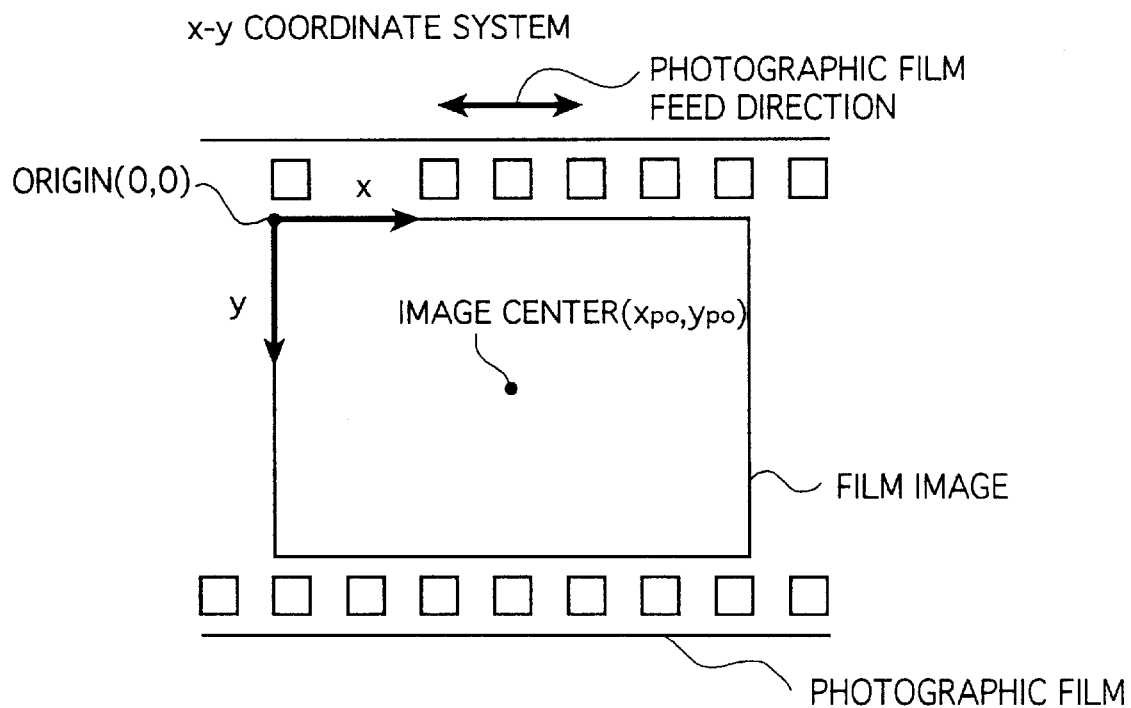
FIGS. 14A and 14B are conceptual diagrams showing an xy-coordinate system set to a film image and an $x_P y_P$-coordinate system, respectively.
Figure 14B:
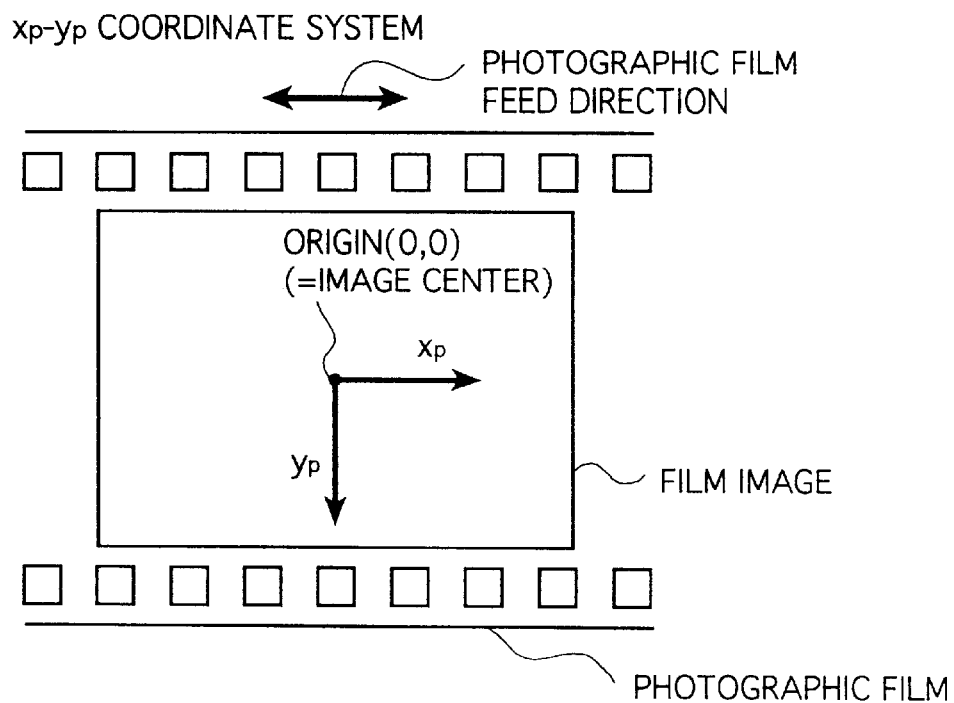

Next, the construction of the image processing unit 416 will be described with reference to FIG. 12. The image processing unit 416 has line scanner compensation units 522R, 522G and 522B so as to correspond to data of R, G and B colors applied from the scanner 414. The line scanner compensation units 522R, 522G and 522B are identical to each other in construction, and will therefore be collectively referred to simply as "scanner compensation unit 522, without being distinguished from one another."

The scanner compensation unit 522 performs such processes as dark compensation, density conversion, shading compensation and defective pixel compensation in the order they are mentioned when receiving scanned data from the scanner 414 after the line CCD sensor has read a photographic film. The dark compensation is to reduce the dark output level of a cell corresponding to each pixel based on the received scanned data. The density conversion is to logarithmically convert the data subjected to the dark compensation into data indicating the density of a photographic film. The shading compensation is to compensate the density-converted data for each pixel in accordance with nonuniformity in the amount of light for illuminating the photographic film. The defective pixel compensation is to generate new data for the shading-compensated data of any cell which does not output a signal correctly corresponding to the incident light amount (the so-called defective pixel), through interpolation using the data of the surrounding pixels.

The output terminal of the scanner compensation unit 522 is connected to the input terminal of a selector 532. The data which have been through with the aforementioned respective processes at the scanner compensation unit 522 is applied to the selector 532 as the scanned data. The input terminal of the selector 532 is also connected to the data output terminal of an I/O controller 534, so that the I/O controller 534 applies to the selector 532 file image data received from an external source. The output terminal of the selector 532 is connected to the data input terminals of the I/O controller 534 and the image processor units 536A and 536B, respectively. The selector 532 can output the received image data selectively to the I/O controller 534, and the image processors 536A and 536B, respectively.

The image processor unit 536A has a memory controller 538, an image processor 540, and three frame memories 542A, 542B and 542C. The frame memories 542A, 542B and 542C each has a capacity large enough to store the image data of a film image consisting of one or more frames. The image data received from the selector 532 is stored in any of the three frame memories 542 by the memory controller 538.

As shown in FIG. 13, the image processor 540 of this embodiment has an LF aberration compensation unit 540A and an additional image processing unit 540B connected thereto in the order they are mentioned. The image processor 540 reads the image data stored in the frame memory 542 (which is indicated as "FINE SCAN MEMORY 542" in FIG. 13), and processes the image data in various ways in accordance with processing conditions determined for each image by an automatic setup engine 544 (described later).

Note that the LF aberration compensation unit 540A is activated when the image data to be processed is image data representing a film image photographically recorded on a photographic film by a lens-attached film (also referred to as "LF"). The unit 540A performs various compensation processes for compensating deterioration in image quality attributable to the lens characteristics of the lens-attached film. Specifically, the compensation processes include a reduced marginal lumination compensation process, a distortion aberration compensation process and a lateral chromatic aberration compensation process (hereinafter referred to as "LF aberration compensation processes"). The reduced marginal lumination compensation is to compensate any reduction in lightness at the margins of an image attributable to reduced light at the margins of the lens. The distortion aberration compensation is to compensate any geometric distortion of an image attributable to distortions produced by the lens. The lateral chromatic aberration compensation is to compensate any color blur on an image attributable to lateral chromatic aberrations produced by the lens. Note that the LF aberration compensation processes will be described later.

Further, the image processing unit 540B performs image processes for improving the quality of an output image (standard image processes), such as, e.g., enlargement and reduction, tone conversion, color conversion, hyper-tone process and hyper-sharpness process for an image. The hyper-tone process is to compress the tone of an infrasonic frequency brightness component of an image, and the hyper-sharpness process is to enhance the sharpness of an image while controlling the granularity. Further, the image processing unit 540B may also be designed to make feasible nonstandard image processes to be effected on a single selected image (or on a group of several selected images recorded in a roll of photographic film). The nonstandard processes include: an image process for intentionally changing the tone of an image (e.g., an output image is finished in monochrome; an output image is finished in a portrait form; an output image is finished in sepia, or the like); and an image process for modifying an image (e.g., a person in an original image is finished into a slender figure in a main image or the like).

The image processor 540 is connected to the I/O controller 534. The image data which have been through with the image processes is temporarily stored in the frame memory 542, and then outputted to the I/O controller 534 at a predetermined timing. Since the image processor unit 536B is identical in construction to the aforementioned image processor unit 536A, its description will be omitted.

By the way, the scanner 414 in this embodiment reads each film image twice with different resolutions. In the first scanning operation with a relatively low resolution (hereinafter referred to as "pre-scanning"), the entire photographic film is read under reading conditions so defined as not to saturate the stored charges in the line CCD sensor (the reading conditions being the light amount for wavelength regions having R, G and B colors, respectively, for irradiating the photographic film, and the time for storing charges in the line CCD sensor) even if the density of the film image is extremely low (e.g., even for a negative image under exposure on a negative film). The data obtained by the pre-scanning (the pre-scanned data) is outputted from the selector 532 to the I/O controller 534.

The automatic setup engine 544 is connected to the I/O controller 534. The automatic setup engine 544 has a CPU 546, a RAM 548 (e.g., a DRAM), a ROM 550 (e.g., an electrically erasable and programmable ROM) and an I/O port 552. These components are interconnected through a bus 554. The pre-scanned data outputted from the I/O controller 534 is temporarily stored in the pre-scan memory 535 shown in FIG. 13, and thereafter subjected to a setup calculation process performed by the automatic setup engine 544 and to a simulation image display process performed by a personal computer 558 (described later). The RAM 548 of the automatic setup engine 544 or a memory 562 of the personal computer 558 (described later) is used as the pre-scan memory 535.

FIG. 13 shows as a setup calculation unit 544A a setup calculation function out of various functions achieved by the CPU 546 of the automatic setup engine 544. The setup calculation unit 544A performs the setup calculation process in the following manner. That is, the setup calculation unit 544A identifies the frame positions of a film image based on the pre-scanned data supplied from the I/O controller 534, and extracts data (pre-scanned image data) corresponding to the film image recording region on a photographic film. The unit 544A also identifies the size of the film image, calculates a characteristic volume of the image such as the density, and determines reading conditions under which the scanner 414 reads the image of the pre-scanned photographic film again with a relatively high resolution (hereinafter referred to as "fine scanning"), based on the pre-scanned image data. The setup calculation unit 544A thereafter delivers the obtained frame positions and reading conditions to the scanner 414.

Further, the setup calculation unit 544A automatically determines the processing conditions for processing the image data (fine-scanned image data) obtained by the scanner 414 having effected fine scanning based on a plurality of frames of the pre-scanned image data of the film image, and delivers the determined processing conditions to the image processor 540 of the image processor unit 536. These image processing conditions are determined as follows. First, whether or not there exist a plurality of film images having analogous scenes is determined from such feature parameters as exposure amount and photographing light source type, and other characteristic volumes used during the photographing, and then, when there are several film images having analogous scenes, the processing conditions for these film images are determined so as to be identical or approximate.

The optimal image processing conditions depend on how the processed image data are used: whether the processed image data is to be recorded on a photographic printing paper by the laser printer unit 418, or displayed on display means such as a display, or stored in an information recording medium. The image processing unit 416 has two image processor units 536A and 536B. Thus, when the image data is used so as to be both recorded on a photographic printing paper and outputted to an external device, the setup calculation unit 544A carries out setup calculations for the respective uses, determines the optimal processing conditions for these uses, and applies the calculated processing conditions to the image processor units 536A and 536B. As a result of these operations, the image processor units 536A and 536B perform the image processes on the same fine-scanned image data under the different processing conditions.

Further, the setup calculation unit 544A calculates image recording parameters based on the pre-scanned image data of the film image applied from the I/O controller 534, and delivers the calculated image recording parameters to the laser printer unit 418 at the same time when it delivers image data to be recorded (described later) to the laser printer unit 418. The image recording parameters are used to regulate the gray balance and the like when the laser printer unit 418 records an image on a photographic printing paper. Further, the automatic setup engine 544 similarly determines image processing conditions for file image data supplied from an external source through calculations.

Further, the ROM 550 of the automatic setup engine 544 stores in advance LF aberration compensation data used for the aforementioned LF aberration compensation processes for each type of lens used in various lens-attached films. The LF aberration compensation data in this embodiment includes three kinds of data: reduced marginal lumination compensation data, distortion compensation data and lateral chromatic aberration compensation data. The LF aberration compensation data corresponds to information related to the characteristics of the lenses used in the present invention. The ROM 550 functions as an LF aberration data storage unit 544B (storage means) shown in FIG. 13.

The reduced marginal lumination compensation data is used to make a reduced marginal lumination compensation for compensating any reduction in lightness at the margins of an image attributable to reduced light at the margins of the lens, and is defined per type of lens based on measurements made per type of lens on the fluctuations in light amount (exposure amount) received at various positions on a film image attributable to reduced light at the margins of the lens.

In this embodiment, the coefficients $a_1$, $a_2$ and $a_3$ of a following compensated exposure amount operation expression (see the following expression (1)) are used as the reduced marginal lumination compensation data for making a reduced marginal lumination compensation.

Compensating exposure amount $$\log E(r) = a_1 r + a_2 r^2 + a_3 r^3 \tag{1}$$

where r is the distance from the center position of an image. The following relationship shown in the next expression (2) is established between the aforementioned distance r and the coordinates (x, y) of an arbitrary pixel on an image expressed in an x-y coordinate system (see FIG. 14A) using a corner of the image as the origin, and the coordinates ($x_P$, $y_P$) of an arbitrary pixel on the image expressed in an $x_P$-$y_P$ coordinate system (see FIG. 14B) using the center position ($x_{P0}$, $y_{P0}$) of the image as the origin (=(0, 0)):

$$\begin{aligned} r &= \sqrt{(x_p^2 + y_p^2)} \\ &= \sqrt{((x - x_{P0})^2 + (y - y_{P0})^2)} \end{aligned} \tag{2}$$

The reduced marginal lumination compensation data (the coefficients $a_1$, $a_2$ and $a_3$ exposed in the compensating exposure amount operation expression) is defined per type of lens so that the fluctuations in exposure amount at various positions on a film image may be compensated when the corresponding type of lens is used.

Further, the distortion aberration compensation data (is used so as to make a distortion aberration compensation for compensating any geometrical distortion of an image attributable to distortion aberration produced by a lens, and is defined per type of lens based on measurements made per type of lens on the changes in the direction and amount of pixel position at various positions on a film image attributable to distortion aberration produced by the lens. In this embodiment, G is adopted as a reference color, and the distortion aberration compensation data is obtained by expressing the distortion aberration amount at each position on the film image in terms of a distortion aberration amount $Dx(x_P, y_P)$ in the x-axis direction and a distortion aberration amount $Dy(x_P, y_P)$ in the y-axis direction with the $x_P$-$y_P$ coordinate system as a reference, while decomposing a measured change in the position of a pixel representing G (distortion amount) at each position on the film image attributable to distortion aberration produced by the lens into a component in the x-axis direction (the longitudinal direction of the photographic film) and into a component in the y-axis direction (the direction orthogonal to the x-axis direction).

Further, the lateral chromatic aberration compensation data is used to make a lateral chromatic aberration compensation for compensating color blur on an image attributable to lateral chromatic aberrations produced by a lens, and is defined per type of lens based on measurements made per type of lens on changes in the direction and amount of the position of a pixel having non-reference colors relative to the position of a pixel having the reference color at various positions on a film image attributable to lateral chromatic aberrations produced by the lens.

In this embodiment, R and B colors are adopted as non-reference colors, and the lateral chromatic aberration compensation data for R color is obtained by expressing the lateral chromatic aberration amount at each position on the film image in terms of a lateral chromatic aberration amount $\Delta Rx(x_P, y_P)$ in the x-axis direction for R and a lateral chromatic aberration amount Ry($x_P$, $y_P$) in the y-axis direction for R with the $x_P$-$y_P$ coordinate system as a reference, while decomposing a measured change in the position of a pixel representing R relative to G (lateral chromatic aberration amount) at each position on the film image attributable to lateral chromatic aberrations produced by the lens into components both in the x-axis direction and in the y-axis direction. Further, the lateral chromatic aberration compensation data for B is obtained by expressing the lateral chromatic aberration amount at each position on the film image in terms of a lateral chromatic aberration amount $\Delta Bx$($x_P$, $y_P$) in the x-axis direction for B and a lateral chromatic aberration amount $\Delta By$($x_P$, $y_P$) in the y-axis direction for B with the $x_P$-$y_P$ coordinate system as a reference, while decomposing a measured change in the position of a pixel representing B relative to G (lateral chromatic aberration amount) at each position on the film image attributable to lateral chromatic aberrations produced by the lens into components both in the x-axis direction and in the y-axis direction.

The I/O controller 534 is connected to the laser printer unit 418 through an I/F circuit 556. In the case where the image-processed image data is used for recording an image on a photographic printing paper, the image data processed by the image processor unit 536 is applied, as image data to be recorded, to the laser printer unit 418 from the I/O controller 534 through the I/F circuit 556. Further, the automatic setup engine 544 is connected to the personal computer 558. In the case where the image-processed image data is outputted to an external device as an image file, the image data processed by the image processor unit 536 is applied to the personal computer 558 from the I/O controller 534 through the automatic setup engine 544.

The personal computer 558 has a CPU 560, the memory 562, the display 564, the keyboard 566 (corresponding to the keyboards 566A and 566B of FIG. 11), a hard disk 568, a CD-ROM driver 570, a feed control unit 572, an expansion slot 574 and an image compression/expansion unit 576. These components are interconnected through a bus 578. Note that the display 564 and the keyboard 566 corresponds to display means and input means of the fourth embodiment of the present invention, respectively.

FIG. 13 shows functions related to a simulation image display process out of various functions performed by the CPU 560 of the personal computer 558 in the form of blocks (i.e., a pre-scanned image data processing unit 558A, an image display unit 558B and a key compensation input unit 558C). The pre-scanned image data processing unit 558A reads from the pre-scan memory 535 pre-scanned image data which has been extracted from the pre-scanned image data by the setup calculation unit 544A and which has been re-stored in the pre-scan memory 535, and also reads the image processing conditions determined by the setup calculation unit 544A. Then, the pre-scanned image data processing unit 558A subjects the read pre-scanned image data to image processes equivalent to those image processes in which fine-scanned image data is processed by the image processor 540, to thereby generate simulation image data.

The image display unit 558B includes the display 564. The unit 558B converts the simulation image data generated by the pre-scanned image data processing unit 558A into a signal for displaying the image on the display 564, and displays the simulation image on the display 564 based on that signal. Further, the key compensation input unit 558C includes the keyboard 566. The unit 558C allows an operator to check the image quality and the like of the simulation image displayed on the display 564, and when the operator enters through the keyboard 566 information giving an instruction for modifying the processing conditions as a result of the check, the unit 558C applies such information to the automatic setup engine 544 (actually, to its setup calculation unit 544A). As a result of this operation, the setup calculation unit 544A performs processes including re-calculations of the image processing conditions.

On the other hand, the feed controller 572 is connected to a film carrier 438 set on the scanner 414, and controls the film carrier 438 for feeding a photographic film. Further, when an APS film is set on the film carrier 438, the feed controller 572 receives information (e.g., a print size and the like) which the film carrier 438 reads from the magnetic layer of the APS film.

Further, a driver (not shown) for reading and writing data with respect to an information recording medium such as a memory card, and a communication controller for communicating with other information processing devices are connected to the personal computer 558 through the expansion slot 574. When image data to be outputted to an external device is supplied from the I/O controller 534, the image data is applied to an external device (e.g., the driver, the communication controller or the like) through the expansion slot 574 as an image file. Further, when file image data is supplied from an external source through the expansion slot 574, the supplied file image data is outputted to the I/O controller 534 through the automatic setup engine 544. In this case, the I/O controller 534 delivers the received file image data to the selector 532.

(Operation)

Next, the operation of this embodiment will be described, taking an example in which a film image recorded on a photographic film is read by the scanner 414 and the read image data is subjected to various image processes and then outputted.

As previously described, the scanner 414 reads a film image recorded on a photographic film twice (pre-scanning and fine-scanning). When the scanner 414 pre-scans an entire photographic film which is to be processed (i.e., to be read) and applies the pre-scanned data to the image processing unit 416, the scanner compensation unit 522 subjects the applied pre-scanned data to the processes such as dark compensation, density conversion, shading compensation and defective pixel compensation.

The pre-scanned data supplied from the scanner compensation unit 522 is temporarily stored in the pre-scan memory 535 through the selector 532 and then read by the automatic setup engine 544, and the automatic setup engine 544 (actually its setup calculation unit 544A) and the personal computer 558 (actually its pre-scanned image data processing unit 558A and image display unit 558B) perform pre-scan processes. The pre-scan processes will hereunder be described with reference to the flowcharts shown in FIGS. 15A and 15B. While the FIGS. 15A and 15B show a flow of the pre-scan processes for a single film image, in actuality, a plurality of film images recorded in a single photographic film are concurrently subjected to the following pre-scan processes.

In step 600, the screen position (frame position) of a film image recorded in a photographic film is determined based on the pre-scanned data read from the pre-scan memory 535. The screen position can be determined by defining the edge positions (the positions of the outer edges of the image) on both sides (the upstream and downstream sides) in the direction of feeding the photographic film (along the length of the photographic film) and on both sides in the width direction of the photographic film which is orthogonal to the feed direction.

As proposed by the present applicant in Japanese Patent Application Laid-Open Nos. Hei8-304932, Hei8-304933, Hei8-304934 and Hei8-304935, the edge positions on both sides along the length of the film can be defined by calculating a density change value along the length of the film per pixel based on the density value of each pixel of the pre-scanned data, integrating the calculated density change value per line that extends across the width of the film, and comparing the integrated values on the line basis. The edge positions on both sides across the width of the film can also be defined similarly by calculating a density change value across the width of the film per pixel, integrating the calculated density change value per line that extends along the length of the film, and comparing the integrated values on the line basis. Further, if the photographic film is an APS film, the time required for defining the edge positions can be saved by specifying a region where the edges may be present as a search range based on the region where perforations are formed, and by searching the edges within the specified search range.

Figure 16:
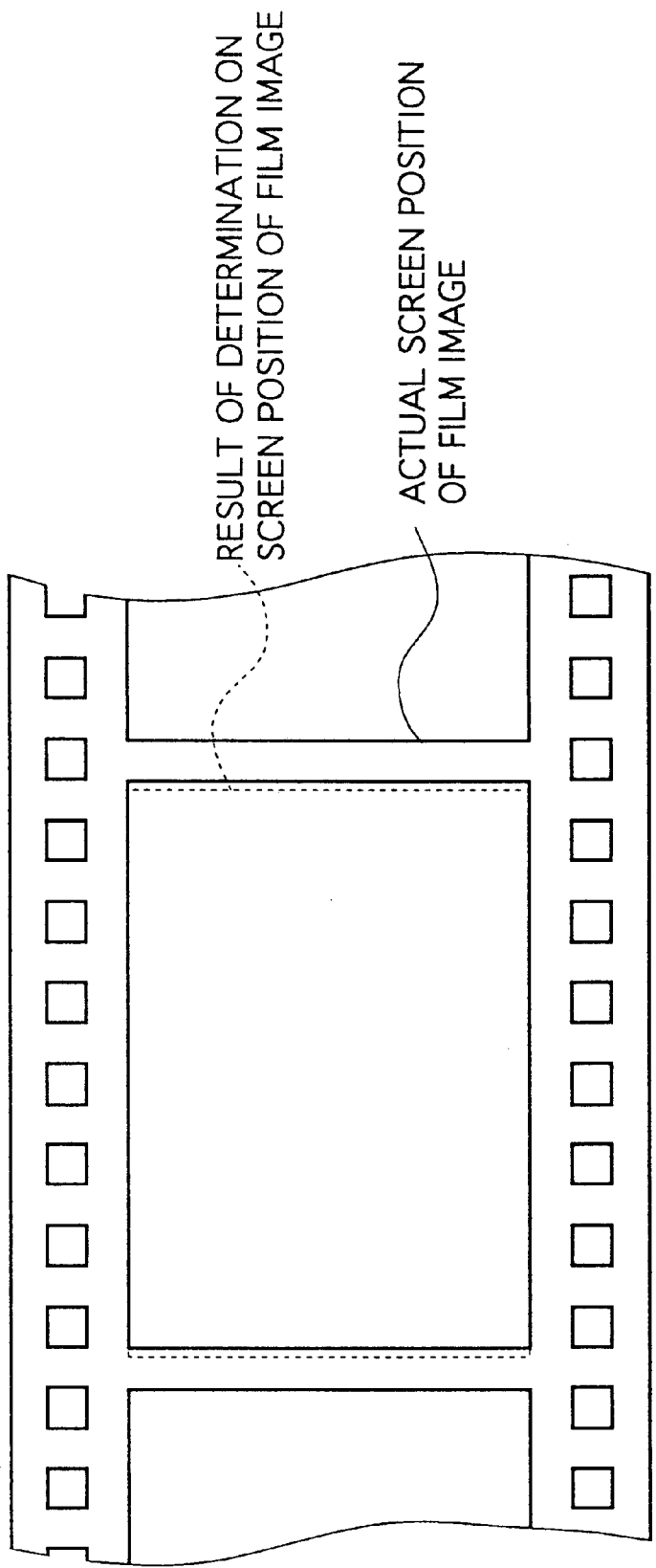
FIG. 16 is an image diagram showing a display example of a picture plane position decision result.

In the next step 602, the automatic setup engine 544 transfers the result of the determination on the screen position of the film image obtained in step 600 to the personal computer 558, and then the image display unit 558B of the personal computer 558 displays on the display 564 the result of the determination on the screen position. As shown in FIG. 16 by way of an example, the result of the determination on the screen position is displayed in terms of the image representing the appearance of the photographic film based on the pre-scanned data, and also in terms of the frame (shown by the broken line in FIG. 16) indicating the result of the determination on the screen position, which is displayed while superimposed on the previously displayed image. As a result of such a display, the operator can be informed of the result of the determination on the screen position, and hence he can easily judge whether the displayed result is proper or not. Step 602 corresponds to the display control means of the fourth embodiment of the present invention.

In step 604, it is determined whether or not the operator has judged proper the result of the determination on the screen position displayed in step 602. If it is determined negatively in step 604, step 606 will be performed, in which it is determined whether or not the information giving an instruction for modifying the result of the determination on the screen position has been entered. If it is determined negatively again in step 606, then go back to step 604 and steps 604 and 606 are repeated. When the operator judges that the result of the determination on the screen position is proper, he operates the keyboard 566 or the like to enter the information indicating that the result of the determination is proper. As a result of this operation, it is determined positively in step 604, and hence step 612 will be performed next.

Further, when the operator has judged that the result of the determination on the screen position is improper (FIG. 16 shows an example in which the determined screen position is deviated from the actual screen position), the operator gives an instruction for modifying the determined screen position by, e.g., pressing an arrow key (not shown) of the keyboard 566. As a result of this operation, it is determined positively in step 606, and the result of the determination on the screen position is modified as instructed (step 608), and the image on the display 564 is changed in accordance with the result of the determination on the modified screen position (step 610), and then step 604 will be performed again. Therefore, even if the screen position determined in step 600 is deviated from the actual screen position, the result of the determination on the screen position can be modified so as to coincide with the actual screen position in accordance with the instruction given by the operator. Step 608 corresponds to the step "MODIFY RESULT OF DETERMINATION ON SCREEN POSITION" performed by the operation means of the fourth embodiment of the present invention.

In step 612, image data (pre-scanned image data) corresponding to a single frame of film image is cut out from the pre-scanned data based on the screen position determined by the aforementioned process. Further, in step 614, various image characteristic volumes including the density of a specific film image corresponding to the pre-scanned image data cut out from the pre-scanned data are calculated based on such cut-out pre-scanned image data, and reading conditions under which the scanner 414 pre-scans the specific film image are calculated based on the obtained image characteristic volumes.

Subsequently, in step 616, it is determined whether or not the image data is subjected to the LF aberration compensations. In this embodiment, the LF aberration compensation processes are performed only when the image data to be so processed is image data representing a film image photographed and recorded on a photographic film using a lens-attached film. Whether or not the image data to be processed is such image data representing a film image photographed and recorded on a photographic film using a lens-attached film is determined in the following manner. That is, the photographic film used as a lens-attached film is brought into the image processing system while accommodated in the body of the lens-attached film, and therefore, when, for example, the photographic film is taken out of the body of the lens-attached film, the type of the lens-attached film is identified, and a mark indicating which one of many lens-attached films currently available in the market is used to photograph that film image is assigned to the photographic film, or if the photographic film is of a type where a magnetic layer is formed, an ID code indicating information similar to the aforementioned mark is recorded in the magnetic layer, and whether the mark is present or not or whether the ID code is recorded or not is checked. Further, the aforementioned mark may be given in advance to a photographic film used as a lens-attached film, or the ID code may be recorded in advance in the magnetic layer at the time when the lens-attached film is manufactured.

When it is determined negatively in step 616, step 618 will be performed, in which the enlargement/reduction rate is set for an enlargement/reduction process to be performed on fine-scanned image data in accordance with the size of the film image or the size of an output image (the image to be recorded on a photographic printing paper, the image to be displayed on the display, or the image represented by image data to be stored in an information recording medium), and then step 638 will be performed. Further, when it is determined positively in step 616, step 620 will be performed, and the pre-scanned image data is subjected to the LF compensation processes in steps 620 to 636.

That is, in step 620, the number of pixels $x_0$ of the pre-scanned image data in the x-axis direction (along the length of the photographic film (see FIG. 14A)) and the number of pixels $y_0$ of the pre-scanned image data in the y-axis direction (across the width of the photographic film (see FIG. 14A)) are calculated based on the pre-scanned image data cut out in step 612. In the step 622, subsequently, a pixel at the $(x_0/2)$th position in the x-axis direction and at $(y_0/2)$th position in the y-axis direction (the pixel having the coordinates $(x_{P0}, y_{P0})$ shown in FIG. 14A, i.e., $x_{P0}=x_0/2$, $y_{P0}=y_0/2$) is extracted as the pixel at the center position of the image, from the pixel equivalent to the corner (the origin shown in FIG. 14A) of the film image.

Note that steps 620 and 622 correspond to the calculation of the center position of the image by the calculation means of this aspect (more specifically, the calculation means of the fourth embodiment of the present invention). Further, since the aforementioned process is performed using the pre-scanned image data, the same steps also correspond to the calculation means of the third embodiment.

In the next step 624, the type of a lens used in photographing the film image represented by the pre-scanned image data is determined. The lens type can be determined by identifying the type of a lens-attached film used for photographing and recording the image on the photographic film while reading the above-described mark or ID code. In step 626, the reduced marginal rumination compensation data corresponding to the lens type determined in step 624 is read, and the reduced marginal rumination compensation is made in accordance with the aforementioned expression (1) using the read reduced marginal lumination compensation data.

In the reduced marginal lumination compensation, each piece of pixel data is subjected to the following processes. Fist of all, the coordinates (x, y) of a pixel to be processed in the x-y coordinate system and the coordinates $(x_{P0}, y_{P0})$ of the pixel extracted as the center position of the image in step 622 are respectively substituted in the aforementioned expression (2), and the distance r between the image to be processed and the center of the image is calculated. Next, the distance r and the previously read reduced marginal lumination compensation data (coefficients $a_1$, $a_2$ and $a_3$) are substituted in the expression (1) to obtain the compensating exposure amount logE. Then, the compensating exposure amount logE is converted into a compensating density value based on the exposure-amount-to-density characteristics of the photographic film, and the density value of the pixel to be processed is shifted by the compensating density value. As a result of these operations, any reduction in lightness at the margins of the image attributable to reduced light at the margins of the lens can be compensated.

The calculation of the expression (2) is equivalent to standardization of the coordinates (x, y) of each pixel with the center position of the image calculated in step 622 as a reference. Since the reduced marginal lumination compensation is made with the center position of the image as a reference, the reduction in lightness at the margins of the image attributable to reduced light at the margins of the lens can be compensated with high accuracy.

In steps 630 to 634, in turn, the pre-scanned image data is subjected to the distortion aberration compensation process and the lateral chromatic aberration compensation process. That is, in step 630, the distortion aberration compensation data and the lateral chromatic aberration compensation data corresponding to the type of lens determined in step 624 are read, and the original position (the pixel position when there are no distortion aberration and lateral chromatic aberrations produced by the lens) of each piece of pixel data of the pre-scanned image data is calculated for each of R, G and B colors for each piece of the pixel data of the pre-scanned image data based on the read distortion aberration compensation data and lateral chromatic aberration compensation data.

This calculation is carried out in the following manner. First of all, the coordinates (x, y) of each pixel is converted (or standardized) into the coordinates $(x_P, y_P)$ in the $x_P$-$y_P$ coordinate system (see FIG. 14B) with the center position of the image calculated in step 622 as a reference (i.e., $x_P=x-x_{P0}$, $y_P=y-y_{P0}$). Next, the distortion aberration amounts $Dx(x_P, y_P)$, $Dy(x_P, y_P)$, and the lateral chromatic aberration amounts $Rx(x_P, y_P)$, $Ry(x_P, y_P)$, $Bx(x_P, y_P)$ and $By(x_P, y_P)$ are searched for the pixel whose standardized coordinates are $(x_P, y_P)$, using the coordinates $(x_P, y_P)$ as a key. Then, the coordinates of the data indicating the density values of the R, G and B colors of the pixel having the coordinates $(x_P, y_P)$ are converted in accordance with the following expressions (3) to (5).

$$R(x_{PR}, Y_{PR}) \leftarrow R(x_P, y_P) \quad (3)$$

where $x_{PR}=x_P+Rx(x_P, y_P)+Dx(x_P, y_P)$, and $y_{PR}=y_P+Ry(x_P, y_P)+Dy(x_P, y_P)$.

$$G(x_{PG}, y_{PG}) \leftarrow G(x_P, y_P) \quad (4)$$

where $x_{PG}=x_P+Dx(x_P, y_P)$, and $y_{PR}=y_P+Dy(x_P, y_P)$.

$$B(x_{PB}, y_{PB}) \leftarrow B(x_P, y_P) \quad (5)$$

where $x_{PB}=x_P+Bx(x_P, y_P)+Dx(x_P, y_P)$, and $y_{PB}=y_P+By(x_P, y_P)+Dy(x_P, y_P)$.

Figure 17B:
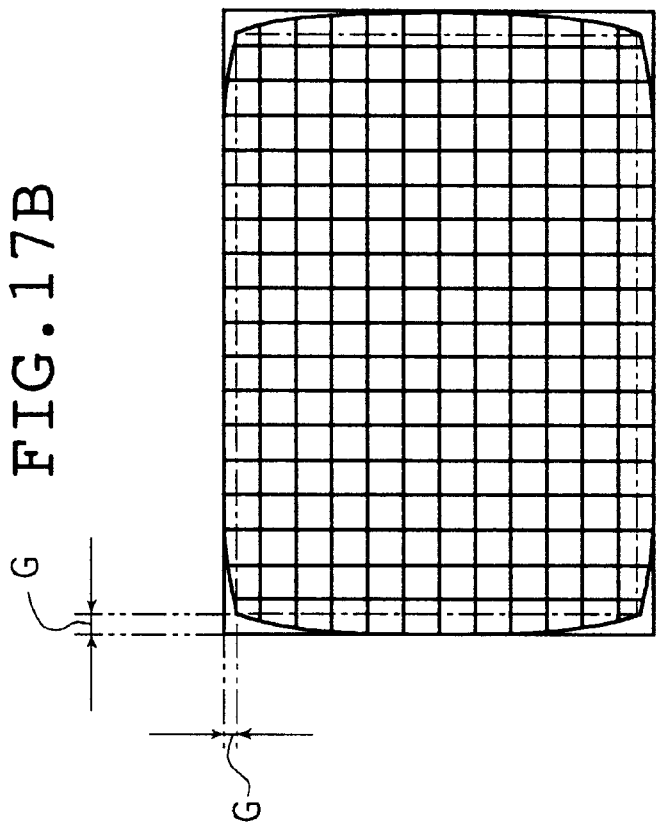
FIGS. 17A and 17B are image diagrams showing examples of outer edge forms of an image which image data after compensation of a geometric distortion and a distortion aberration in the image due to a distortion aberration of a lens indicates.
Figure 17A:
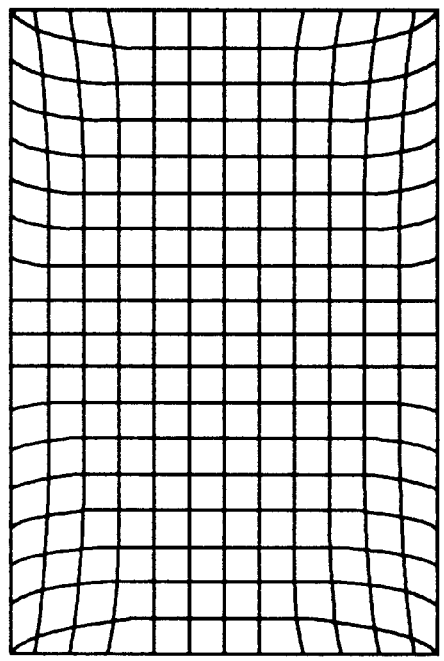

By the way, a film image photographed and recorded on a photographic film using a lens-attached film has a geometric distortion aberration such as shown in FIG. 17A (the so-called pincushion distortion) attributable to distortion aberration produced by the lens. Note that FIGS. 17A and 17B show examples in which an image having many lines arranged in a grid-like form is photographed and recorded on a photographic film using a lens-attached film. When the image having the aforementioned geometric distortion aberration is subjected to the distortion aberration compensation process, the shape of the periphery of the image becomes so-called barrel-like as shown in FIG. 17B, and regions where density values are undefined (the blank regions near the four corners of the image in FIG. 17B (hereinafter referred to as "image-missing regions")) are produced. Thus, when the distortion aberration compensation is made, the image data to be used as an output image (e.g., the image data within the range indicated by the one-dot chain line in FIG. 17B) needs to be cut out from the image data that has been distortion aberration-compensated lest the image missing regions should be included in the output image, and the cut-out image data needs to be enlarged or reduced so as to correspond to the size of the output image.

The size of the image missing regions (the image missing amount) depends on the magnitude of a distortion aberration produced by a lens. Thus, in the next step 632, the image missing amount is calculated based on the previously read distortion aberration amounts Dx and Dy. In the following step 634, the enlargement/reduction rate is set based on both the image missing amount calculated in step 632 and the simulation image size for checking, e.g., the image processing condition for displaying the image data on the display 564, and the interpolation and enlargement/reduction processes are performed in accordance with the set enlargement/reduction rate.

In the previous step 630, the coordinates of each pixel of the image data are converted in accordance with the distortion aberration and lateral chromatic aberrations produced by the lens. Therefore, the position of each pixel represented by the image data whose coordinates have been converted is deviated from the corresponding grid-like point position in most cases. Thus, in the interpolation and enlargement/ reduction processes, the following operations are performed. First, the image data whose coordinates have been converted in step 630 is subjected to the enlargement/reduction process so as to correspond to the size of the simulation image size in accordance with the previously set enlargement/reduction rate. Then, the density value of each pixel located at the grid-like point position is calculated for each of the R, G and B colors through interpolation using the density values of the pixels located around the grid-like point position of interest for each of the R, G and B colors.

In the above-mentioned example, the distortion aberration and lateral chromatic aberration compensations are made with the center position of the image as a reference by standardizing the coordinates (x, y) of each pixel with the center position of the image as a reference. Therefore, the present invention can provide the image data for which the geometric distortion aberration and color blur attributable to distortion aberration and lateral chromatic aberrations produced by the lens have been compensated with high accuracy and for which the enlargement/reduction process for removing the image missing regions has been performed.

Note that the enlargement/reduction rate for the fine-scanned image data also depends on the size of the output image. Thus, in the next step 636, the original enlargement/ reduction rate calculated from both the size of the film image and the size of the output image is modified in accordance with the image missing amount calculated in step 632, and the enlargement/reduction rate to be used in the interpolation and enlargement/reduction processes for the fine-scanned image data is set based on the modified rate.

In the next step 638, various image feature parameters of the film image are calculated based on the pre-scanned image data, and the image processing conditions for the fine-scanned image data are determined based on the calculated image feature parameters. Then, the pre-scanned image data is transferred to the personal computer 558 through the pre-scan memory 538, and the image processing conditions for the fine-scanned image data are transferred to the personal computer 558.

In response thereto, the personal computer 558 performs the image checking process in step 640 and the following steps. That is, the pre-scanned image data processing unit 558A generates simulation image data by subjecting the pre-scanned image data to an image process equivalent to the image process performed on the fine-scanned image data by the image processor 540 based on the image processing conditions transferred from the automatic setup engine 544. Further, the image display unit 558B displays on the display 564 a simulation image based on the simulation image data which has been generated by the pre-scanned image data processing unit 558A (step 642). The simulation image represents a finished image to be obtained when a print is prepared using the fine-scanned image data processed by the image processor 540.

When the simulation image is displayed on the display 564, the operator visibly confirms the simulation image and checks whether the quality of the simulation image is proper or not (i.e., whether the standard image processing conditions calculated by the automatic setup engine 544 are proper or not), and enters information indicating the result of the check through the keyboard 566. In the next step 644, it is determined whether the operator has entered information giving an instruction for modifying the processing conditions or not.

When the operator has entered the information giving an instruction for modifying the image processing conditions, it is determined positively instep 644, and thus step 646 will be performed, in which the automatic setup engine 544 modifies the processing conditions in accordance with the entered instruction. Then, step 638 will be performed back. As a result, a modified version of the simulation image 600 in accordance with the entered instruction is displayed. The operator visibly confirms the displayed modified simulation image, so that the operator can easily judge whether the modification information he entered is proper or not. When the operator enters information indicating the result of the check is acceptable, it is determined negatively in step 644, and the image checking process, i.e., the pre-scan processes are terminated.

On the other hand, upon completion of the pre-scanning on the photographic film, the scanner 414 performs a fine-scan process for reading the photographic film per film image. For the fine scanning, the automatic setup engine 544 sends the reading conditions for each film image to the scanner 414, and the scanner 414 then reads (fine-scans) each film image in accordance with the sent reading conditions.

Further, the automatic setup engine 544 sends the image processing conditions for each film image to the image processor 540 when the image processor 540 receives the fine-scanned image data of each film image from the scanner 414. The image processor 540 performs the image processes on the received fine-scanned image data of each film image in accordance with the sent image processing conditions.

Here, in the case where the photographic film set on the scanner 414 is a photographic film on which an image is photographed and recorded by a lens-attached film, the LF aberration compensation unit 540A of the image processor 540 performs processes similar to steps 620 to 634 for performing the above-described pre-scan processes (however, for the interpolation and enlargement/reduction processes described in step 634, the enlargement/reduction rate calculated in step 636 as an enlargement/reduction rate is used). As a result of these processes, the present invention can provide image data for which a reduction in lightness at the margins of the image attributable to reduced light at the margins of the lens, and geometric distortion aberration and color blur attributable to distortion aberration and lateral chromatic aberrations produced by the lens have been compensated using the center position of the image as a reference with high accuracy, from which the image missing regions have been eliminated, and for which the enlargement/reduction process has been performed so as to coincide with the size of the output image.

The fine-scanned image data received from the image processor 540 is outputted from the image processor 540 as image data to be outputted after various image processes, other than the aforementioned image process, have been performed by the image processing unit 540B. Such image data to be outputted is used to be recorded on a photographic printing paper by the laser printer unit 418, or displayed on the display 564, or stored in an information storage medium such as a memory card through the expansion slot 574.

While the examples in which reduction in lightness at the margins of an image attributable to reduced light at the margins of the lens, geometric distortion aberration of the image attributable to distortion aberration produced by the lens, and color blur on the image attributable to lateral chromatic aberrations produced by the lens are compensated as the LF aberration compensations (the compensations of deteriorations in image quality attributable to lens characteristics) have been described above, the LF aberration compensations are not limited to these examples. For example, at least one of these compensations may be performed, or other types of compensations such as a compensation of a reduction in the sharpness of an image attributable to, e.g., curvature of field produced by a lens may also be made.

Further, while deteriorations in image quality attributable to lens characteristics have been compensated only when image data to be processed represents a film image photographed and recorded on a photographic film using a lens-attached film, these compensations may also be made on image data other than such image data. The other image data includes, e.g., image data representing a film image photographed and recorded on a photographic film using a camera, such as a relatively inexpensive compact camera, which exhibits a great reduction in image quality attributable to lens characteristics, and image data stored in an information recording medium after it has been photographed using a digital camera which exhibits a great reduction in image quality attributable to lens characteristics. The aforementioned compensations may further be made on all image data representing an image recorded on a recording material using a lens and on all image data obtained by photographing an image using a lens, regardless of the degree of reduction in image quality attributable to lens characteristics.

When image data, which is obtained by reading an image recorded on a recording material such as a photographic film using an image reader such as the scanner 414, is used as image data to be processed, the compensations may additionally be made for a reduction in image quality attributable to the characteristics of the lenses used in the image reader.

As described in the foregoing, according to this embodiment of the present invention, the center position of an image is calculated by determining the screen position of the image based on data obtained by reading a recording material on which the image is projected and recorded through a lens, and based on information related to the characteristics of the lens, the image data is subjected to processes for compensating deteriorations in the quality of the image represented by the image data attributable to the characteristics of the lens with the calculated center position of the image as a reference. Therefore, such an excellent advantage can be obtained in which image data obtained by reading an image recorded on a recording material is subjected to compensation processes so that deteriorations in image quality attributable to lens characteristics can be compensated with high accuracy.

According to the third embodiment of the present invention, in the first embodiment of the present invention, the center position of an image is calculated based on preliminary data obtained by preliminary reading a recording material with a predetermined resolution, and primary data obtained by primarily reading the recording material with a resolution higher than the predetermined resolution is subjected to processes for compensating deteriorations in image quality attributable to lens characteristics. Therefore, such an advantage can be obtained in which the center position of an image can be calculated in a shorter time, in addition to the aforementioned advantage.

According to the fourth embodiment of the present invention, in the first embodiment of the present invention, the result of a determination on a screen position is displayed on display means, and when information giving an instruction for modifying the result of the determination on the screen position is entered through input means, the result of the determination on the screen position is modified in accordance with the entered instruction, and the center position of an image is calculated based on the modified screen position. Therefore, an advantage of preventing the reduction in the accuracy of compensating the image quality deteriorations attributable to lens characteristics can be attained even if the screen position of the image is erroneously determined, in addition to the aforementioned advantages.

While the image processing method and apparatus in accordance with the present invention have been described in detail in the foregoing, the present invention is not to be limited to the aforementioned embodiments. It goes without saying that the present invention can be improved and modified in various ways within such a scope as not to depart from the spirit thereof.

What is claimed is:

1. An image processing method, comprising the steps of:
    obtaining input image data from an image optically photographed by using a photographic lens; and
    executing a compensating process using position information of the image for at least one aberration of a chromatic aberration of magnification and a distortion aberration of the input image data; wherein:
    a compensating level of the aberration is first set to an initial value, an aberration compensation result is displayed on a monitor after subjecting the input image data to the compensating process for the aberration, and the compensating level is capable of being designated at a plurality of stages wherein the compensating level is selectively varied with respect to the initial value; and
    each time when one of the plurality of stages is designated, the compensating process for the aberration is again executed for the input image data according to the compensating level of a previously designated stage, and the aberration compensation result is displayed on the monitor.

2. An image processing method according to claim 1, wherein the initial value is a default value, and wherein the initial value is one of a plurality of compensating coefficients of a compensating function for at least one aberration of the chromatic aberration of magnification and the distortion aberration, which is preset in accordance with the default value or an aberration pattern corresponding to the image.

3. An image processing method according to claim 1, wherein the initial value is a compensating value which is automatically determined by pixel position information of the image and lens characteristics of the photographic lens, or a compensating value which is determined by an instruction of the operator; and the compensating level is designated as one of a plurality of compensating coefficients of a compensating function for at least one aberration in compensating functions of the chromatic aberration of magnification and the distortion aberration, which is set according to the lens characteristics of the photographic lens, or designated by an instruction of the operator.

4. An image processing method according to claim 1, wherein the compensation of at least one aberration of the chromatic aberration of magnification and the distortion aberration is performed in at least one direction of a first direction of the image and a second direction orthogonal to the first direction.

5. An image processing method according to claim 1, wherein when the aberration is subjected to the compensating process in accordance with the designated compensating level, the compensation result displayed on the monitor is replaced with the image data in a state of the aberration compensation result in which the compensating level is the initial value or the input image data in a state before the aberration compensation.

6. An image processing method according to claim 1, wherein an unprintable quantity, which is caused as a result of the aberration compensation, is calculated in accordance with the designated compensating level, to display on the monitor a printable effective area together with the aberration compensated image.

7. An image processing method according to claim 1, wherein prior to the compensating process for at least one aberration of the chromatic aberration of magnification and the distortion aberration, the image before the aberration compensating process is displayed on the monitor on the basis of the input image data and a print area is designated;

the compensating process of the aberration, for which the compensating level is changed at a plurality of stages in the designated print area, is executed; and the compensating process, in which the aberration compensation is maximum, is executed.

8. An image processing method according to claim 1, wherein the initial value is zero.

9. An image processing method, comprising the steps of:

obtaining input image data from an image optically photographed by using a photographic lens; and executing a compensating process using position information of the image for at least one aberration of a chromatic aberration of magnification and a distortion aberration of the input image data; wherein:

the compensation of the aberration is executed by designating a print area from the photographed image region, by calculating a compensating coefficient of a compensating function of the aberration from a vignetting quantity of image, which is determined from the designated print area, and by using the calculated compensating coefficient and the compensating function of the aberration.

10. An image processing apparatus, in which input image data is obtained from an image optically photographed by using a photographic lens and a compensating process is executed using position information of the image for at least one aberration of a chromatic aberration of magnification and a distortion aberration of the input image data, comprising:

an image display device for displaying the image after the aberration has been compensated on the basis of the input image data;

means for obtaining an initial value of a compensating level of the aberration;

means for designating the compensating level obtained by the obtaining means at a plurality of stages; and means for compensating the aberration according to the initial value of the compensating level obtained by the obtaining means or the stage of the compensating level designated by the designating means, wherein the compensating process for the aberration is performed by the compensating means in accordance with the initial value of the compensating level obtained by the obtaining means, to display the compensation result on the image display device, and thereafter, the designating means designates the stage of the compensating level from the displayed compensated image, and performs the compensating process for the aberration according to the previously designated stage of the compensating level, to display the compensation result on the image display device wherein the compensating level is selectively varied with respect to the initial value.

11. An image processing apparatus, comprising:

calculating means for discriminating a picture position of an image on a recording material on the basis of data obtained by reading the recording material to which the image has been projected and recorded through a lens, and for calculating a center position of the image on the basis of the determined picture plane position;

means for obtaining information relating to characteristics of the lens; and means for compensating, on the basis of the information relating to the characteristics of the lens obtained by the obtaining means, a deterioration of an image quality due to the characteristics of the lens in the image indicated by image data with the center position of the image calculated by the calculating means as a reference for the image data of the image.

12. An image processing apparatus according to claim 11, wherein on the basis of the determined picture plane position, the calculating means calculates position, as a center position in the image, the position along a first direction almost parallel to two sides among four sides constituting an outer edge of the picture plane being located at a center of both edge portions along the first direction in the picture plane, and a position along a second direction orthogonal to the first direction, which locates at a center of both edge portions along the second direction in the picture plane.

13. An image processing apparatus according to claim 11, wherein the calculating means, on the basis of preliminary read data obtained by preliminarily reading the recording material by a predetermined resolution, calculates the center position of the image, and the compensating means performs the compensation for main reading data, obtained by a main reading operation for reading the recording material by a resolution higher than the predetermined resolution.

14. An image processing apparatus according to claim 11, further comprising:

display means for displaying the image;

display control means for displaying the decision result of the picture plane position obtained by the calculating means on the display means; and input means for inputting information instructing a compensation for the decision result of the picture plane position displayed on the display means, wherein when the information instructing the compensation for the decision result of the picture plane position is inputted through the input means, the calculating means compensates the decision result of the picture plane position according to the instruction and calculates the center position on the basis of the compensated picture plane position.

* * * * *